United States Patent
Oshima

(10) Patent No.: US 8,434,119 B2
(45) Date of Patent: Apr. 30, 2013

(54) COMMUNICATION APPARATUS AND COMMUNICATION METHOD

(75) Inventor: Hajime Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 12/498,248

(22) Filed: Jul. 6, 2009

(65) Prior Publication Data

US 2010/0011402 A1    Jan. 14, 2010

(30) Foreign Application Priority Data

Jul. 8, 2008    (JP) .................................. 2008-178451

(51) Int. Cl.
*H04N 7/173* (2011.01)

(52) U.S. Cl.
USPC .................. 725/90; 725/93; 725/96; 725/116

(58) Field of Classification Search ............... 725/88, 725/89, 90, 93, 94, 95, 96, 100, 114, 115, 725/116, 131, 134; 375/240.01, 240.12, 375/240.13, 240.14, 240.15; 386/345, 346, 386/347, 348
See application file for complete search history.

(56) References Cited

U.S. PATENT DOCUMENTS

| 7,522,816 B2* | 4/2009 | Bullwinkle et al. .......... 386/291 |
| 7,529,263 B1* | 5/2009 | Sparrell et al. ................ 370/437 |
| 2003/0236906 A1 | 12/2003 | Klemets |
| 2005/0120377 A1* | 6/2005 | Carlucci et al. ................. 725/90 |
| 2005/0155072 A1* | 7/2005 | Kaczowka et al. ............. 725/95 |
| 2006/0059223 A1 | 3/2006 | Klemets |
| 2006/0146780 A1* | 7/2006 | Paves ........................... 370/348 |
| 2007/0234385 A1* | 10/2007 | Bopardikar et al. ........... 725/38 |
| 2008/0282308 A1* | 11/2008 | McDonald et al. .......... 725/116 |

FOREIGN PATENT DOCUMENTS

| JP | 05-344494 A | 12/1993 |
| JP | 08-265691 A | 10/1996 |
| JP | 11-184780 A | 7/1999 |
| JP | 2000-299841 A | 10/2000 |
| JP | 2004-54930 A | 2/2004 |
| JP | 2005-328500 A | 11/2005 |
| JP | 2007-243982 A | 9/2007 |

* cited by examiner

*Primary Examiner* — John Schnurr

(74) *Attorney, Agent, or Firm* — Canon USA, Inc., I.P. Division

(57) ABSTRACT

A communication apparatus for receiving video data transmitted by streaming from a transmission apparatus via a transmission path includes a video data reception unit configured to receive the video data, a reception data monitoring unit configured to monitor a processing status of the video data received by the video data reception unit, and a control request transmission unit configured to transmit a playback control request for the video data to the transmission apparatus, wherein, when the video data is played back at a playback speed, if the reception data monitoring unit determines that the playback speed exceeds a transmission capacity of the transmission path or a processing capacity of the communication apparatus, the control request transmission unit transmits to the transmission apparatus a playback control request to request only intra-picture coded video data.

22 Claims, 15 Drawing Sheets

(PRIOR ART)
FIG.1

[DESCRIBE (START SESSION)]
C→S Request: DESCRIBE rtsp://server/by RTSP/1.0
    CSeq: 1
    Accept: application/sdp
    Bandwidth: 384000
S→C Response: RTSP/1.0 200 OK
    CSeq: 1
    Connection: Keep-alive
    Date: Fri, 09 Mar 2007 08:03:39 GMT
    Content-type: application/sdp
    Content-Base: rtsp://server/movie.mp4
    Content-length: 945
    (...)
[SETUP (SET DISTRIBUTION)]
C→S Request: SETUP rtsp://server/movie.mp4/trackID=4 RTSP/1.0
    CSeq: 2
    Transport: RTP/AVP;unicast;client_port=6970-6971
S→C Response: RTSP/1.0 200 OK
    CSeq: 2
    Connection: Keep-alive
    Date: Fri, 09 Mar 2007 08:03:40 GMT
    Session: 41.18497
    Transport: RTP/AVP;unicast;client_port=6970-6971;source=
    192.168.0.1;server_port=7000-7001;ssrc=6784
[PLAY (PLAYBACK)]
C→S Request: PLAY rtsp://server/movie.mp4/ RTSP/1.0
    CSeq: 3
    Range: npt=0.000000-60.000000
    Session: 41.18497
S→C Response: RTSP/1.0 200 OK
    CSeq: 3
    Connection: Keep-alive
    Date: Fri, 09 Mar 2007 08:03:40 GMT
    Session: 41.18497
    RTP-Info: url=rtsp://server/movie.mp4/trackID=4;seq=19169;
    rtptime=6334
[PAUSE (PAUSE)]
C→S Request: PAUSE rtsp://server/movie.mp4/ RTSP/1.0
    CSeq: 4
    Session: 41.18497
S→C Response: RTSP/1.0 200 OK
    CSeq: 4
    Connection: Keep-alive
    Date: Fri, 09 Mar 2007 08:04:00 GMT
    Session: 41.18497
[PLAY (FAST-FORWARD PLAYBACK)]
C→S Request: PLAY rtsp://server/movie.mp4/ RTSP/1.0
    CSeq: 5
    Range: npt=12.000000-60.000000           ← 101
    Scale: 5                                  ← 102
    Session: 41.18497

FIG.6

CONFIGURATION OF HEADER OF RTP PACKET   61

| V | P | X | CC | M | PT | sequence number |

| timestamp |

| synchronization source (SSRC) identifier |

| contributing source (CSRC) identifiers ... |

FIG.8

```
[DESCRIBE (START SESSION)]
C→S Request: DESCRIBE rtsp://server/by RTSP/1.0
     CSeq: 1
     Accept: application/sdp
82 ─── Bandwidth: 384000
S→C Response: RTSP/1.0 200 OK
     CSeq: 1
     Connection: Keep-alive
     Date: Fri, 09 Mar 2007 08:03:39 GMT
     Content-type: application/sdp
     Content-Base: rtsp://server/movie.mp4
     Content-length: 945
     (...)
[SETUP (SET DISTRIBUTION)]
C→S Request: SETUP rtsp://server/movie.mp4/trackID=4 RTSP/1.0
     CSeq: 2
     Transport: RTP/AVP;unicast;client_port=6970-6971
S→C Response: RTSP/1.0 200 OK
     CSeq: 2
     Connection: Keep-alive
     Date: Fri, 09 Mar 2007 08:03:40 GMT
     Session: 41.18497
     Transport: RTP/AVP;unicast;client_port=6970-6971;source=
     192.168.0.1;server_port=7000-7001;ssrc=6784
[PLAY (PLAYBACK)]
C→S Request: PLAY rtsp://server/movie.mp4/ RTSP/1.0
     CSeq: 3
     Range: npt=0.000000-60.000000
     Session: 41.18497
S→C Response: RTSP/1.0 200 OK
     CSeq: 3
     Connection: Keep-alive
     Date: Fri, 09 Mar 2007 08:03:40 GMT
     Session: 41.18497
     RTP-Info: url=rtsp://server/movie.mp4/trackID=4;seq=19169;
     rtptime=6334
[PAUSE (PAUSE)]
C→S Request: PAUSE rtsp://server/movie.mp4/ RTSP/1.0
     CSeq: 4
     Session: 41.18497
S→C Response: RTSP/1.0 200 OK
     CSeq: 4
     Connection: Keep-alive
     Date: Fri, 09 Mar 2007 08:04:00 GMT
     Session: 41.18497
[PLAY (FAST-FORWARD PLAYBACK)]
C→S Request: PLAY rtsp://server/movie.mp4/ RTSP/1.0
     CSeq: 5
     Range: npt=12.000000-60.000000
     Scale: 5
     Session: 41.18497
81 ─── x-Intra-Only: true
```

FIG.10

| V | P | RC | PT=RR=201 | length | |
|---|---|---|---|---|---|
| SSRC of packet sender | | | | | |
| SSRC_1 (SSRC of first source) | | | | | |
| fraction lost | | | cumulative number of packets lost | | ~100 |
| extended highest sequence number received | | | | | |
| interarrival jitter | | | | | |
| last SR (LSR) | | | | | |
| delay since last SR (DLSR) | | | | | |
| SSRC_2 (SSRC of second source) | | | | | |
| . . . | | | | | |
| profile-specific extensions | | | | | |

FIG.11

```
[DESCRIBE (START SESSION)]
C→S Request: DESCRIBE rtsp://server/by RTSP/1.0
    CSeq: 1
    Accept: application/sdp
    Bandwidth: 384000
S→C Response: RTSP/1.0 200 OK
    CSeq: 1
    Connection: Keep-alive
    Date: Fri, 09 Mar 2007 08:03:39 GMT
    Content-type: application/sdp
    Content-Base: rtsp://server/movie.mp4
    Content-length: 945
    (...)
[SETUP (SET DISTRIBUTION)]
C→S Request: SETUP rtsp://server/movie.mp4/trackID=4 RTSP/1.0
    CSeq: 2
    Transport: RTP/AVP;unicast;client_port=6970-6971
S→C Response: RTSP/1.0 200 OK
    CSeq: 2
    Connection: Keep-alive
    Date: Fri, 09 Mar 2007 08:03:40 GMT
    Session: 41.18497
    Transport: RTP/AVP;unicast;client_port=6970-6971;source=
    192.168.0.1;server_port=7000-7001;ssrc=6784
111 ──── x-AvailSpeed: 5;10;20
[PLAY (PLAYBACK)]
C→S Request: PLAY rtsp://server/movie.mp4/ RTSP/1.0
    CSeq: 3
    Range: npt=0.000000-60.000000
    Session: 41.18497
S→C Response: RTSP/1.0 200 OK
    CSeq: 3
    Connection: Keep-alive
    Date: Fri, 09 Mar 2007 08:03:40 GMT
    Session: 41.18497
    RTP-Info: url=rtsp://server/movie.mp4/trackID=4;seq=19169;
    rtptime=6334
[PAUSE (PAUSE)]
C→S Request: PAUSE rtsp://server/movie.mp4/ RTSP/1.0
    CSeq: 4
    Session: 41.18497
S→C Response: RTSP/1.0 200 OK
    CSeq: 4
    Connection: Keep-alive
    Date: Fri, 09 Mar 2007 08:04:00 GMT
    Session: 41.18497
[PLAY (FAST-FORWARD PLAYBACK)]
C→S Request: PLAY rtsp://server/movie.mp4/ RTSP/1.0
    CSeq: 5
    Range: npt=12.000000-60.000000
    Scale: 5
    Session: 41.18497
    x-Intra-Only: true
```

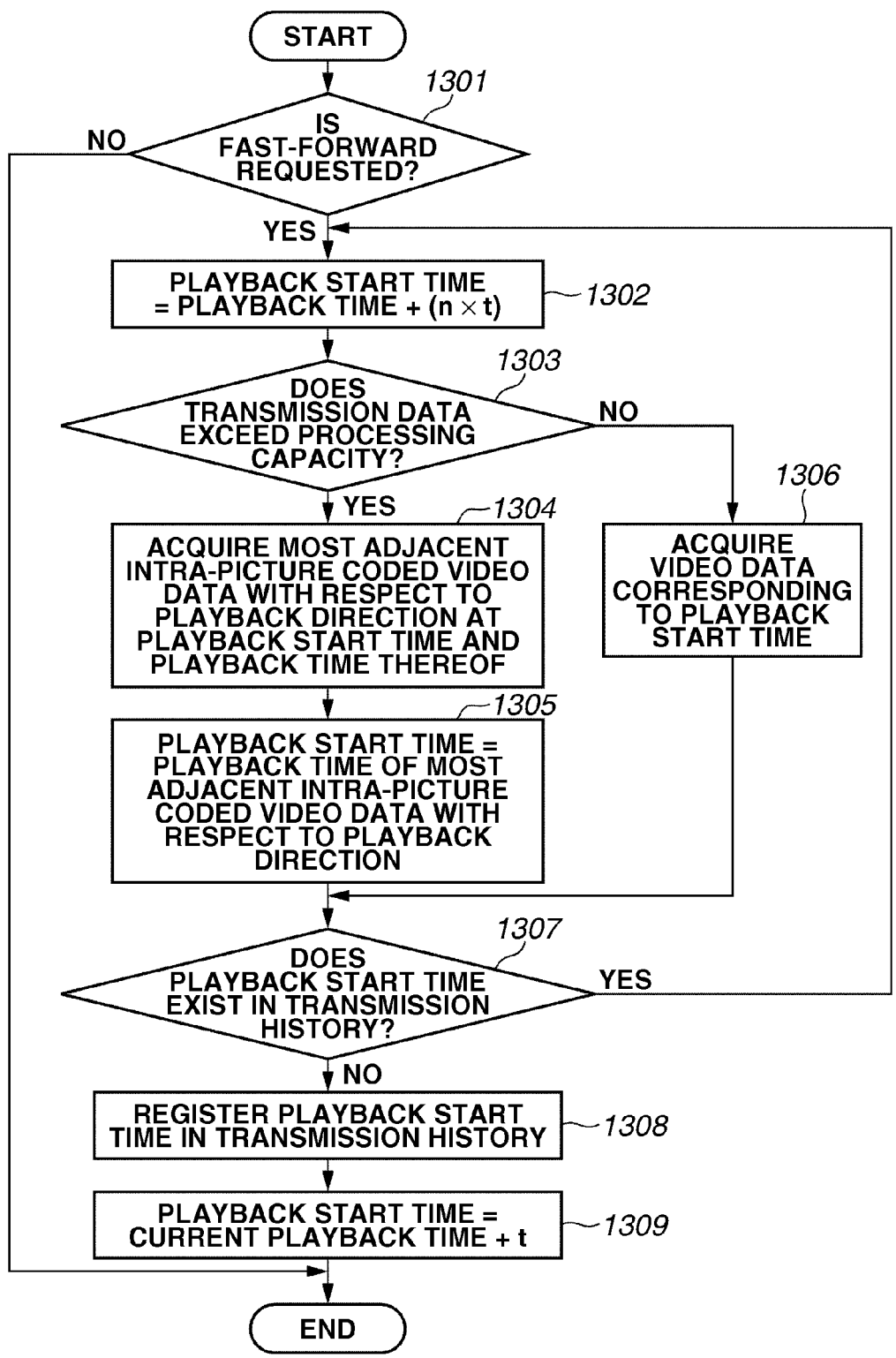

FIG.14

```
...
[PLAY (FAST-FORWARD PLAYBACK 1)]
C→S Request: PLAY rtsp://server/movie.mp4/ RTSP/1.0
     CSeq: 5
141—  Range: npt=12.000000-60.000000
     Session: 41.18497
[PAUSE (PAUSE)]
C→S Request: PAUSE rtsp://server/movie.mp4/ RTSP/1.0
     CSeq: 6
     Session: 41.18497
S→C Response: RTSP/1.0 200 OK
     CSeq: 6
     Connection: Keep-alive
     Date: Fri, 09 Mar 2007 08:04:00 GMT
     Session: 41.18497
[PLAY (FAST-FORWARD PLAYBACK 2)]
C→S Request: PLAY rtsp://server/movie.mp4/ RTSP/1.0
     CSeq: 7
142—  Range: npt=12.500000-12.500000
     Session: 41.18497
[PAUSE (PAUSE)]
C→S Request: PAUSE rtsp://server/movie.mp4/ RTSP/1.0
     CSeq: 8
     Session: 41.18497
S→C Response: RTSP/1.0 200 OK
     CSeq: 8
     Connection: Keep-alive
     Date: Fri, 09 Mar 2007 08:04:00 GMT
     Session: 41.18497
[PLAY (FAST-FORWARD PLAYBACK 3)]
C→S Request: PLAY rtsp://server/movie.mp4/ RTSP/1.0
     CSeq: 9
143—  Range: npt=13.000000-13.000000
     Session: 41.18497
[PAUSE (PAUSE)]
C→S Request: PAUSE rtsp://server/movie.mp4/ RTSP/1.0
     CSeq: 10
     Session: 41.18497
S→C Response: RTSP/1.0 200 OK
     CSeq: 10
     Connection: Keep-alive
     Date: Fri, 09 Mar 2007 08:04:01 GMT
     Session: 41.18497
[PLAY (FAST-FORWARD PLAYBACK 4)]
C→S Request: PLAY rtsp://server/movie.mp4/ RTSP/1.0
     CSeq: 11
144—  Range: npt=13.500000-13.500000
     Session: 41.18497
...
```

COMMUNICATION APPARATUS AND COMMUNICATION METHOD

BACKGROUND OF THE INVENTION

1. Field of the Invention

The present invention relates to a video distribution system that distributes video in real time via a transmission path.

2. Description of the Related Art

In recent years, with the development of a technique for encoding moving image data, network capacity has been increased and a data transmission technique has been developed. As a result, a viewing style according to the related art where video, which is physically accumulated in a storage medium, such as a video tape recorder (VTR) or digital versatile disc (DVD), is viewed has been changed to a viewing style such as "Video On Demand" where desired video content is received via a network, such as the Internet.

Further, as a method for distributing video content via a network, there is a method called as a streaming method (streaming distribution) where the content is divided into packets having small sizes according to a transmission path and is transmitted in time series. If video content is distributed by streaming, even though a user uses a viewing terminal that has a small storage capacity, the user can view video in real time without considering a capacity needed to store the video content.

As a form of the streaming distribution, a form where video photographed by a web camera is distributed in real time via the Internet is typically used. However, the streaming distribution form is not limited thereto, and moving image content previously stored in a content server may be viewed by streaming.

To perform the streaming distribution on the Internet, among Internet standard communication protocols defined by the Internet Engineering Task Force (IETF), the Real Time Streaming Protocol (RTSP) or the Transport Protocol for Real-Time Applications (RTP) can be mainly used. The RTSP is used for playback control such as a playback session start and acquisition, playback, and stop of content information, and is determined by the Request For Comments (RFC) 2326. The RTP, which is a base protocol for video data distribution, is defined by the RFC 1889 and the RFC 3550. In addition to the RTSP or RTP, a standard protocol based on an encoding format is used when video data is transmitted. For example, in the case of MPEG-4 Video, the RTP Payload Format for Moving Picture Experts Group phase 4 (MPEG-4) Audio/Visual Streams (RFC 3016) is used together with the RTP.

A method for performing fast-forward playback and rewind playback of video content in the streaming distribution method is described in the RTSP specification. As an example, FIG. 1 illustrates a communication sequence in the case where a mode of video content, which is encoded in an MPEG-4 Video format using the RTSP and the RTP, is switched into a fast-forward playback mode while the video content is viewed, and the video content is distributed. A communication sequence (refer to FIG. 1) that is used between a distribution server S and a client terminal (viewing terminal) C starts, when an operation related to the fast-forward playback is performed by the client terminal during a normal playback.

First, the client terminal transmits a DESCRIBE (start session) command to start a playback session to the distribution server. The distribution server, which has received the DESCRIBE command, returns a response with respect to the corresponding command to the client terminal.

Next, the client terminal issues a SETUP (set distribution) command to the distribution server and performs distribution preparation. The distribution server, which has received the SETUP command, returns setting information, which is needed to transmit and receive video data, as a response.

In addition, the client terminal transmits a PLAY (playback) command to the distribution server to start playback of video content. If the distribution sever receives the PLAY command, the distribution server returns a response and transmits video data through the RTP.

The flow of the normal playback operation has been described. Next, a sequence performed when a fast-forward playback (high-speed playback) is performed in the middle of the normal playback operation illustrated in the second half in FIG. 1 will be described. In this case, the case where an operation related to the fast-forward playback is performed at a point of time when the playback operation has been performed for 12 seconds during the playback of video data of 60 seconds is exemplified. Further, it is assumed that the fast-forward playback speed is 5×.

To pause distribution in the current normal playback mode at a point of time when the operation related to the fast-forward playback is performed during the normal playback and the fast-forward request is generated, the client terminal transmits a PAUSE command to the distribution server. If the distribution server receives the PAUSE command from the client terminal, the distribution sever stops the distribution of the video data in a state where the distribution server maintains a connection with the client terminal.

Thereafter, the client terminal retransmits a PLAY command to the distribution server to perform the fast-forward playback. However, unlike the first PLAY command, the PLAY command requests the playback starting with video after 12 seconds at a playback speed of 5×.

More specifically, in FIG. 1, a Range field 101 shows a playback range, and a portion shown by "Range: npt=12.000000–60.000000" indicates a request of the playback starting with video after 12 seconds (from video after 12 seconds to video after 60 seconds). Further, a Scale field 102 shows a playback speed, and a portion shown by "Scale: 5" indicates that the playback speed is 5×.

Further, if a negative value is designated as a value in the Scale field, it is possible to request the rewind playback. Further, in the RTSP specification, a Speed field that has the same meaning as the Scale field is also defined, and may be used instead of the Scale field.

As such, according to the second PLAY command (PLAY command to perform the fast-forward playback), an interval of time from the fast-forward playback start time to the ending time indicating the final portion of the content is designated by the Range field. The distribution server, which has received the PLAY command, distributes video data from a point of time of the designated video after 12 seconds at a playback speed of 5×.

However, in the sequence, the following problems may exist.

When the playback speed designated by the Scale (or Speed) field is faster than the normal playback speed and the amount of the transmitted video data exceeds a processing capacity of the client terminal, the video data may not be completely processed by the client terminal, and abnormality may occur in the playback operation.

Further, when the amount of the transmitted video data exceeds a bandwidth of a network between the distribution server and the client terminal, it may cause a network failure, such as congestion or packet loss, during the transmission of the video data. As a result, abnormality may occur in the playback operation in the client terminal, and packet transmitting and receiving processes of other nodes that belong to the network may be abnormally executed.

For example, if the playback speed at the high-speed playback is set as n (the playback at the normal speed is performed in the case of n=1), a bit rate at the time of the high-speed playback becomes n times faster than a bit rate at the time of the playback at the normal speed. If the bit rate at the time of the playback at the normal speed is set as B and the maximum transmission bit rate at the network is set as X, the above-described network failure may occur in the case of X<(B×n).

Further, as in the MPEG format, when inter-picture predictive coded (inter-frame predictive coded) video data is included, the video at the playback start time designated by the Range field cannot necessarily be decoded and played back only with video data at the designated time. When the video data at the designated time is an inter-picture predictive coded picture (a P picture or a B picture), data of reference pictures for the designated picture is also needed at the time of decoding to accurately decode and play back the video at the designated time. Accordingly, when the inter-picture predictive coded video data is included, if the video data at the designated time is only transmitted, a decoded result cannot be secured at the client terminal. As a result, an abnormal playback operation may be performed.

In the streaming-type video distribution system according to the related art, even when the fast-forward playback and the rewind playback are performed, picture data is transmitted according to a normal sequence. Therefore, the client terminal at the reception side is required to execute a special playback process. In particular, to perform the rewind playback, entire data of group of pictures (GOP) in the MPEG needs to be acquired and decoded, and the acquired pictures and the display images after decoding need to be stored to play back the acquired pictures and the display images after decoding in reverse order. For this reason, an increase in cost may arise.

As a technique for realizing a special playback process in the related art, Japanese Patent Application Laid-Open No. 2004-54930 discusses a caching technique for streaming media content at the side of a client terminal. According to the caching technique discussed in Japanese Patent Application Laid-Open No. 2004-54930, the client terminal caches streaming media. Thereby, even when various shuttle control options (for example, pause, stop, fast-forward, seek, and rewind) are selected, it is possible to continue streaming of the content.

However, according to the conventional technique discussed in Japanese Patent Application Laid-Open No. 2004-54930, to store streaming-distributed content data in the client terminal, a temporary storage unit that has a sufficient capacity is needed. Accordingly, the caching technique is effective in a client terminal that includes a large-capacity storage device, such as a personal computer. Meanwhile, in the case of a client terminal where it is physically and costly difficult to include a large-capacity storage device, such as a portable terminal, the caching technique is ineffective. If the caching technique is used to realize a special playback, a cost of the client terminal may be increased.

Further, in regards to the conventional caching technique, to perform the special playback using the cached and distributed video data in the client terminal, the caching technique can be applied to the case of the rewind playback but cannot be applied to the case of the high-speed playback in the forward direction. Accordingly, when the above-described caching technique is applied and the high-speed playback in the forward direction is performed, it is not possible to improve disadvantages, such as a transmission disturbance due to an increase in traffic of the network or a playback failure due to an increase in the load on the client terminal.

SUMMARY OF THE INVENTION

Accordingly, the patent invention is directed to a communication apparatus that can perform a special playback including a fast-forward playback and a rewind playback according to an allowed load without increasing a cost.

According to an aspect of the present invention, a communication apparatus for receiving video data transmitted by streaming from a transmission apparatus via a transmission path includes a video data reception unit configured to receive the video data, a reception data monitoring unit configured to monitor a processing status of the video data received by the video data reception unit, and a control request transmission unit configured to transmit a playback control request for the video data to the transmission apparatus, wherein, when the video data is played back at a playback speed, if the reception data monitoring unit determines that the playback speed exceeds a transmission capacity of the transmission path or a processing capacity of the communication apparatus, the control request transmission unit transmits to the transmission apparatus a playback control request to request only intra-picture coded video data.

According to an exemplary embodiment of the present invention, when video data is played back at a playback speed, if it is determined that the playback speed exceeds a transmission capacity of a transmission path or a processing capacity of a reception apparatus, the reception apparatus receives only intra-picture coded video data according to the playback speed. As a result, a fast-forward playback or a rewind playback can be performed without providing a large-capacity storage device in a device that receives the video data and with a low load. Further, a special playback including the fast-forward playback and the rewind playback can be performed according to an allowed load without increasing a cost.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a diagram illustrating a communication sequence of the RTSP of a video distribution system according to the related art.

FIG. 6 is a diagram illustrating a packet and header configuration of the RTP.

FIG. 8 is a diagram illustrating an example of a communication sequence of the RTSP between a transmission apparatus and a reception apparatus according to the first exemplary embodiment.

FIG. 10 is a diagram illustrating a configuration of a Receiver Report (RR) packet of the RTCP.

FIG. 11 is a diagram illustrating an example of a communication sequence of the RTSP between a transmission apparatus and a reception apparatus according to a third exemplary embodiment of the present invention.

FIG. 13 is a flowchart illustrating an example of an operation of a transmission apparatus according to a fourth exemplary embodiment of the present invention.

FIG. 14 is a diagram illustrating an example of a communication sequence of the RTSP between a transmission apparatus and a reception apparatus according to a fifth exemplary embodiment of the present invention.

DETAILED DESCRIPTION OF THE EMBODIMENTS

Various exemplary embodiments, features, and aspects of the invention will be described in detail below with reference to the drawings.

Figure 2:
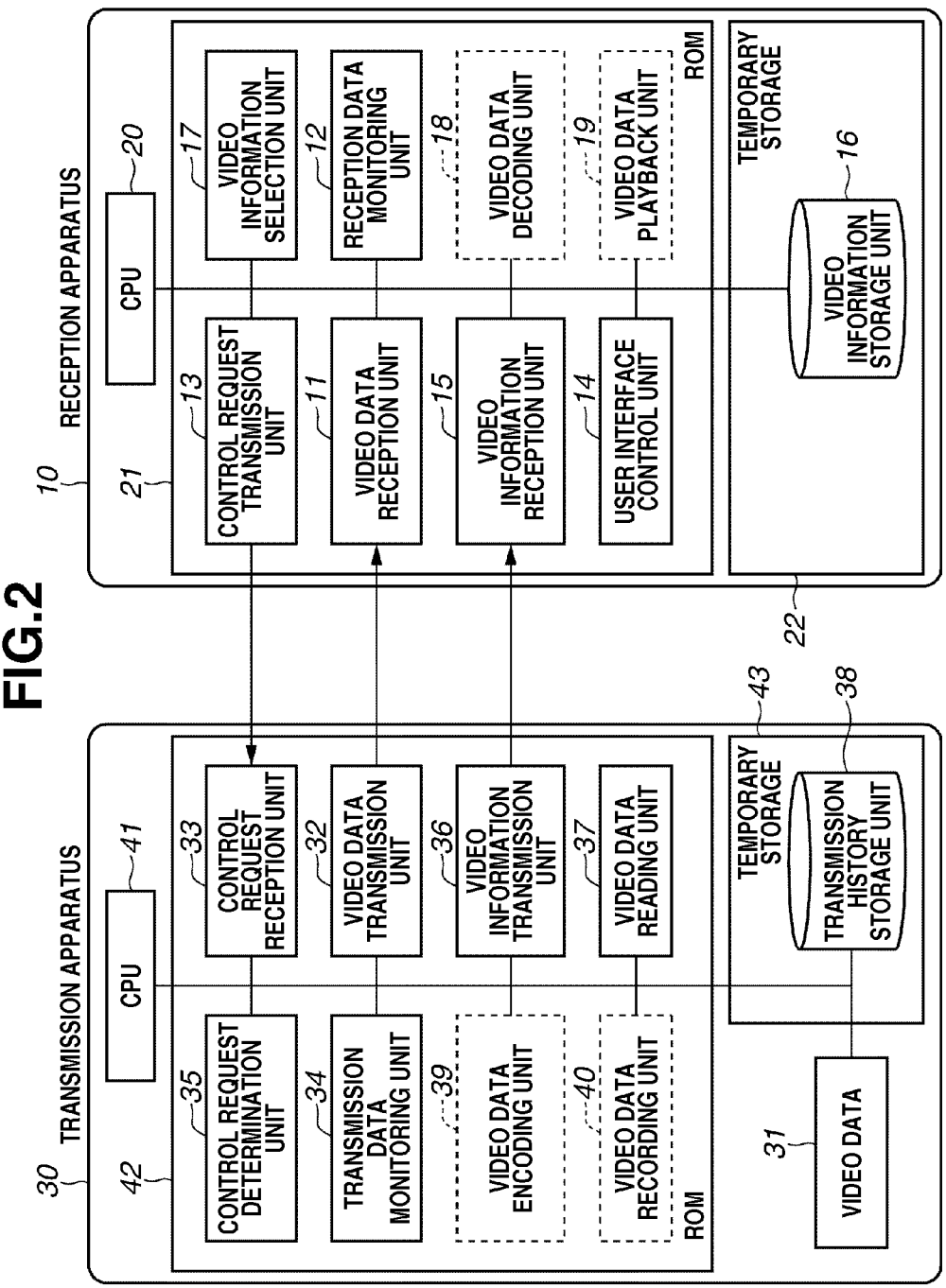
FIG. 2 is a diagram illustrating an example of a configuration of a communication system according to an exemplary embodiment of the present invention.

FIG. 2 is a block diagram illustrating an example of a configuration of a communication system (video distribution system) according to an exemplary embodiment of the present invention. The communication system according to the exemplary embodiment is a streaming-type video distribution system, and includes a server device that serves as a transmission apparatus (distribution server for video content) 30 and a client device that serves as a reception apparatus (client terminal (viewing terminal) for video content) 10. The server device that serves as the transmission apparatus 30 and the client device that serves as the reception apparatus 10 can communicate with each other via a network, such as the Internet, which is a transmission path, and video data is streaming-transmitted from the transmission apparatus 30 to the reception apparatus 10. In one example, functions of the server device and those of the client device may be realized in a single computer device, respectively. In another example, individual functions may be realized in a manner being distributed to a plurality of computer devices connected to each other via a local area network (LAN) or a universal serial bus (USB), such that they can communicate with each other.

In the reception apparatus 10, a video data reception unit 11 receives video data packetized and transmitted (distributed) by streaming from the transmission apparatus 30 via the network. A reception data monitoring unit 12 monitors a processing status (reception situation), such as the total amount of received data of the received video data, a bit rate of the received data, and information indicating whether there is a transmission error at the time of receiving the video data. A control request transmission unit 13 transmits a playback control request, such as a playback start, a pause, and a playback speed designation, to the transmission apparatus 30.

A user interface control unit 14 receives an operation from a user using the reception apparatus 10, and performs control related to a user interface to instruct the transmission apparatus 30 to perform a playback operation, such as a playback start, a pause, and a special playback, via an input device, such as a pointing device or a keyboard. A video information reception unit 15 receives video information, such as image intervals (frame intervals) of intra-picture coded images among video content transmitted from the transmission apparatus 30. The video information is included in reply data that is a response from the transmission apparatus 30 with respect to the playback control request transmitted from the control request transmission unit 13.

A video information storage unit 16 stores the video information received by the video information reception unit 15. The video information storage unit 16 stores the information related to the image intervals of the intra-picture coded images. A video information selection unit 17 selects any one of the image intervals stored in the video information storage unit 16.

A video data decoding unit 18 decodes the video data received by the video data reception unit 11. A video data playback unit 19 extracts time information included in the video data decoded by the video data decoding unit 18, and displays video related to the received video data on a screen at timing indicated in the extracted time information. Further, the video data decoding unit 18 and the video data playback unit 19 are illustrated in the drawings, because the video data decoding unit 18 and the video data playback unit 19 are not essential elements in each exemplary embodiment of the present invention but are generally mounted in a video receiving client.

A central processing unit (CPU) 20 performs control on the reception apparatus 10. The CPU 20 executes software stored in a memory or a storage device or externally supplied software to control the individual functional units in the reception apparatus 10. The CPU 20 reads out software (process program) from a read-only memory (ROM) 21 and executes the software, thereby performing a control operation to realize the operation in each exemplary embodiment.

The individual functional units 11, 12, 13, 14, 15, 16, 17, 18, 19, and 20 in the reception apparatus 10 are connected to each other via a system bus, such that they can communicate with each other.

The video data reception unit 11, the reception data monitoring unit 12, the control request transmission unit 13, and the user interface control unit 14 are mounted in the ROM 21, which stores a program or a parameter, which does not need to be changed. Further, the video information reception unit 15, the video information selection unit 17, the video data decoding unit 18, and the video data playback unit 19 are also mounted in the ROM 21.

The video information storage unit 16 is a random access memory (RAM) that stores a changed parameter, and is mounted as a temporary storage unit 22. Examples of the temporary storage unit 22 may include a hard disk or a memory card fixedly disposed in the device, an optical disk, such as a floppy disk (FD) or a compact disc (CD), which can be separated from the device, a magnetic or optical card, an integrated circuit (IC) card, and a memory card.

In the transmission apparatus 30, video data 31 of video content packetized and transmitted (distributed) by streaming from the transmission apparatus 30. A video data transmission unit 32 packetizes the video data 31 stored in the transmission apparatus 30 and the playback control information such as time information in a format suitable for the network and transmits the video data 31 and the playback control information by streaming via the transmission path. A control request reception unit 33 receives the playback control request, such as the playback start, the pause, or the playback speed designation, which is transmitted from the reception apparatus 10. A transmission data monitoring unit 34 monitors the processing status, such as the amount of transmission data of the transmitted video data and the bit rate of the transmission data.

A control request determination unit 35 analyzes contents of the playback control request received by the control request reception unit 33 and determines how to play back and distribute the video data. A video information transmission unit 36 transmits video information, such as image intervals (frame intervals) of intra-picture coded images of the video content, to the reception apparatus 10.

A video data reading unit 37 reads out video information included in the video data 31, such as the video data, the time information, an encoding format of the video data, or an encoding attribute indicating whether the video data is intra-picture coded data. Further, when information used to packetize the video data is included in the video data 31, the video data reading unit 37 reads out the information. A transmission history storage unit 38 holds a history of the time information added to the video data transmitted form the video data transmission unit 32.

A video data encoding unit 39 digitizes a video signal obtained from a video input apparatus, such as a camera, a television or a video (which is not illustrated in the drawings), which is connected to the transmission apparatus 30, and encodes the video signal. A video data recording unit 40 records video data encoded by the video data encoding unit 39 as the video data 31. In addition to the video data 31, the video data recording unit 40 may record supplementary information used at the time of transmitting the video data. Further, the video data encoding unit 39 and the video data recording unit 40 are illustrated in the drawings, because the video data encoding unit 39 and the video data recording unit 40 are not essential elements in each exemplary embodiment of the present invention but are generally mounted in a product, such as a so-called network camera or a camera server that enables record video of the camera to be viewed from a remote place on the network.

A CPU 41 performs control on the transmission apparatus 30. The CPU 41 executes software stored in a memory or a storage device or externally supplied software to control the individual functional units in the transmission apparatus 30. The CPU 41 reads out software (process program) from a ROM 42 and executes the software, thereby performing a control operation to realize the operation in each exemplary embodiment.

The individual functional units 31, 32, 33, 34, 35, 36, 37, 38, 39, 40, and 41 in the transmission apparatus 30 are connected to each other via a system bus, such that they can communicate with each other.

The video data transmission unit 32, the control request reception unit 33, the transmission data monitoring unit 34, and the control request determination unit 35 are mounted in the ROM 42, which stores a program or a parameter, which does not need to be changed. Further, the video information transmission unit 36, the video data reading unit 37, the video data encoding unit 39, and the video data recording unit 40 are also mounted in the ROM 42.

The transmission history storage unit 38 is a RAM that stores a changed parameter, and is mounted as a temporary storage unit 43. Examples of the temporary storage unit 43 may include a hard disk or a memory card fixedly disposed in the device, an optical disk, such as a FD or a CD, which can be separated from the device, a magnetic or optical card, an IC card, and a memory card. Further, the video data 31 exists in an internal place of the transmission apparatus 30 or an external place where the transmission apparatus 30 can have access to the video data 31, and a record form thereof is not limited.

Further, in the reception apparatus 10 and the transmission apparatus 30 according to the exemplary embodiment, communication protocols are assumed to be protocols, such as an RTSP and RTP, which support real-time video communication protocols in the network. However, the present invention is not limited thereto, and the communication protocols may be other protocols that have a similar object as the RTSP or RTP. Further, the reception apparatus 10 and the communication device 30 of the exemplary embodiment communicate with each other via a network, such as a public network like the Internet or a communication network like Ethernet or Institute of Electrical and Electronic Engineers (IEEE) 802.11. However, the present invention is not limited thereto, and other networks may be used.

Next, a user interface used to allow the reception apparatus 10 according to the exemplary embodiment to instruct the transmission apparatus 30 to perform a playback operation, such a playback start, a pause, and a special playback, will be described.

Figure 3:
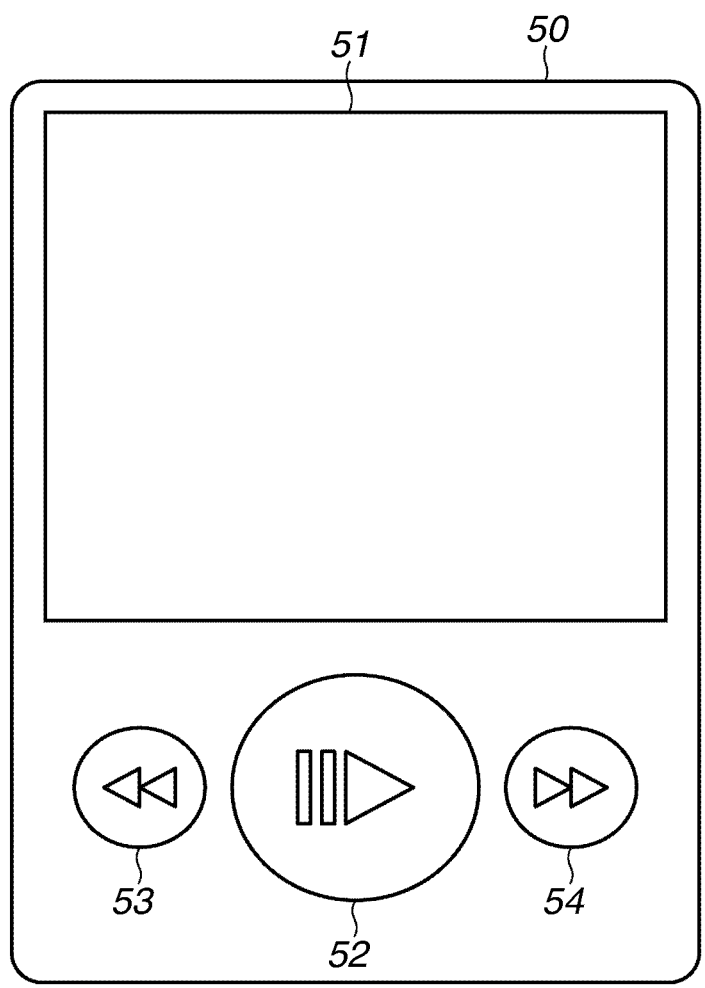
FIG. 3 is a diagram illustrating an example of a user interface according to an exemplary embodiment of the present invention.

FIG. 3 is a diagram illustrating an example of a user interface 50 according to the exemplary embodiment.

In the user interface 50, a display area 51 displays video. In the display area 51, since the received video data is output to the video data playback unit 19 after being decoded by the video data decoding unit 18, video related to the video data is displayed.

A playback button 52 is used to start or stop a playback of the received video data. In the exemplary embodiment, the playback button 52 is a toggle switch, and a stop process can be controlled using the same button by a toggle state. However, the playback button and the stop button may be provided as buttons that are different from each other.

A rewind button 53 is used to play back the video data at a high speed in the backward direction. A fast-forward button 54 is used to play back the video data at a high speed in the forward direction. The rewind button 53 and the fast-forward button 54 provide functions of playing back the video data at a high speed in the backward and forward directions, respectively. A frame-by-frame playback function and a slow playback function, which specially play back the video data in the backward and forward directions, respectively, may be provided as portions of the functions of the rewind button 53 and the fast-forward buttons 54 or may be provided by additionally providing other buttons.

Further, in the exemplary embodiment, the user interface 50 provides the buttons to provide the individual functions. However, the present invention is not limited thereto, and the user interface 50 may use a jog dial or a wheel, a lever, a keypad, a joystick, and a shuttle controller to provide similar functions and a form thereof is not limited.

In the following description, a time interval between the played-back images is displayed by t, and a playback speed at the time of an nx-speed forward playback during the normal playback (playback at a normal speed) is displayed by n. That is, when the video data is played back in the forward direction, an image of an image interval of (n×t) is displayed. Further, when the video data is played back in the backward direction, it is assumed that n has a negative value. Accordingly, the image interval (n×t) becomes a negative number. Further, since the playback speed n during the normal playback is 1, the playback speed n during the slow playback becomes have a value that is less than 1.

A first exemplary embodiment of the present invention will be described.

Figure 4:
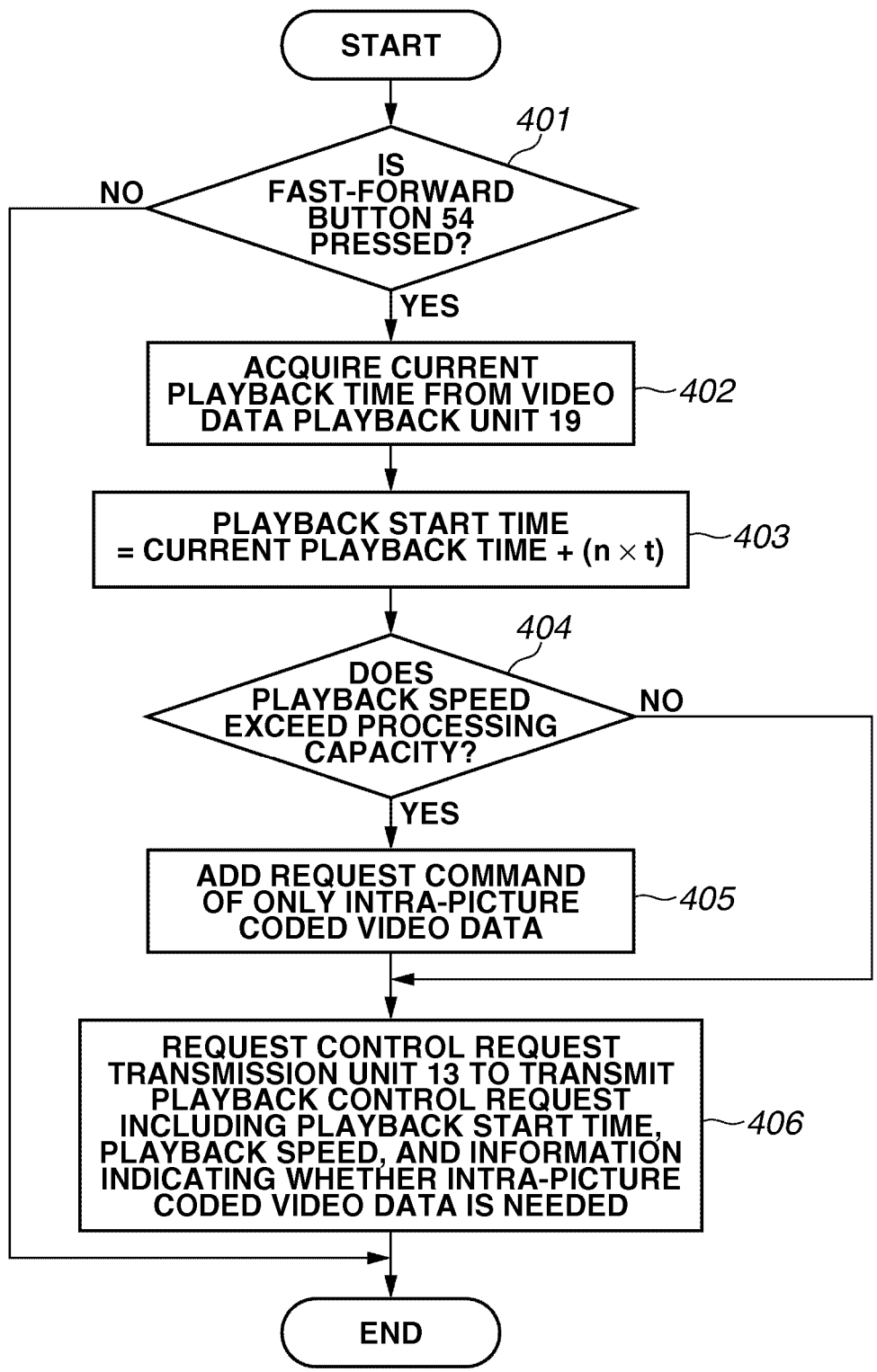
FIG. 4 is a flowchart illustrating an example of an operation of a reception apparatus according to a first exemplary embodiment of the present invention.

Hereinafter, a process of the reception apparatus 10 in the case where the fast-forward playback (high-speed playback in the forward direction) is performed using the user interface 50 will be described with reference to FIG. 4. FIG. 4 is a flowchart illustrating an example of a process operation of the reception apparatus 10 according to the first exemplary embodiment. The process illustrated in FIG. 4 is executed when a specific operation with respect to the user interface 50 is performed, more specifically, when an input operation with respect to the fast-forward button 54 of the user interface 50 is performed.

In step 401 illustrated in FIG. 4, the CPU 20 determines whether the fast-forward button 54 disposed in the user interface 50 is pressed. When it is determined that the fast-forward button 54 is pressed (YES in step 401), then in step 402, the CPU 20 acquires playback time information of the video data during the process of the video data playback unit 19. Then, the process proceeds to step 403. When, in step 401, it is determined that the fast-forward button 54 is not pressed (NO in step 401), the CPU 20 completes the process illustrated in FIG. 4.

In step 403, the CPU 20 sets a time value, which is obtained by adding (a playback speed n×a time interval t between images) to a current playback time of the video data obtained in step 402, as a playback start time. In the case of the fast-forward playback, as the playback speed n, a value that is larger than 1, typically, an arbitrary fixed value defined by the user interface specification of the reception apparatus 10 is used.

Next, in step 404, the receiving data monitoring unit 12 determines whether the amount of data received when the data is played back at the designated playback speed exceeds a processing capacity of the system. Specifically, the reception data monitoring unit 12 determines whether the amount of the received data exceeds the amount of data that can be processed by the reception apparatus 10 or the amount of data that can be transmitted via the network. Further, how to determine whether the amount of data exceeds a processing capacity and the transmission capacity is described after describing a process illustrated in the flowchart of FIG. 4.

If, in step 404, it is determined that the amount of data received when the data is fast-forward played back at the designated playback speed exceeds a processing capacity of the system (YES in step 404), the CPU 20 proceeds to step 405. In step 405, the CPU 20 adds, to the playback control request transmitted with respect to the transmission apparatus 30, a command to request only intra-picture coded video data, where video of one screen can be decoded and displayed only by the video data. The command added to the playback control request requests that inter-picture predictive coded video data decoded by referring to video data of another screen (another frame) is not transmitted (transmission of the video data is prohibited).

By the processes of steps 402 to 405, a playback start time and information indicating whether a request for only intra-picture coded video data is needed are set. In step 406, the CPU 20 instructs the control request transmission unit 13 to transmit a playback control request, and requests the transmission apparatus 30 to transmit the video data. The transmitted playback control request includes the playback start time, the playback speed n, and the information indicating whether the request for only the intra-picture coded video data is needed, which are set by the processes.

The video data of the playback start time sequentially transmitted from the transmission apparatus 30 as a response to the playback control request transmitted from the reception apparatus 10 by the above-described method is received by the video data reception unit 11 of the reception apparatus 10, and is then decoded by the video data decoding unit 18. In addition, the decoded video data is delivered to the video data playback unit 19, and the video that corresponds to the playback start time is displayed in the display area 51 illustrated in FIG. 3.

Further, when only the intra-picture coded video data is requested by the playback control request, only the intra-picture coded video data as the video data is sequentially transmitted from the transmission apparatus 30. Further, the video data that is already received by the reception apparatus 10 before issuing the playback control request, or is decoded and stored in the device may be cleared before or after issuing the playback control request.

Hereinafter, the procedure returns to step 401, and the processes illustrated in FIG. 4 are continuously executed while the fast-forward button 54 of the user interface 50 is pressed.

Next, in step 404 of the flowchart illustrated in FIG. 4, a specific example of a method where the reception data monitoring unit 12 determines whether the amount of received data exceeds the processing capacity by the reception apparatus 10 and the transmission capacity by the network will be described with reference to FIGS. 5 and 6.

Figure 5:
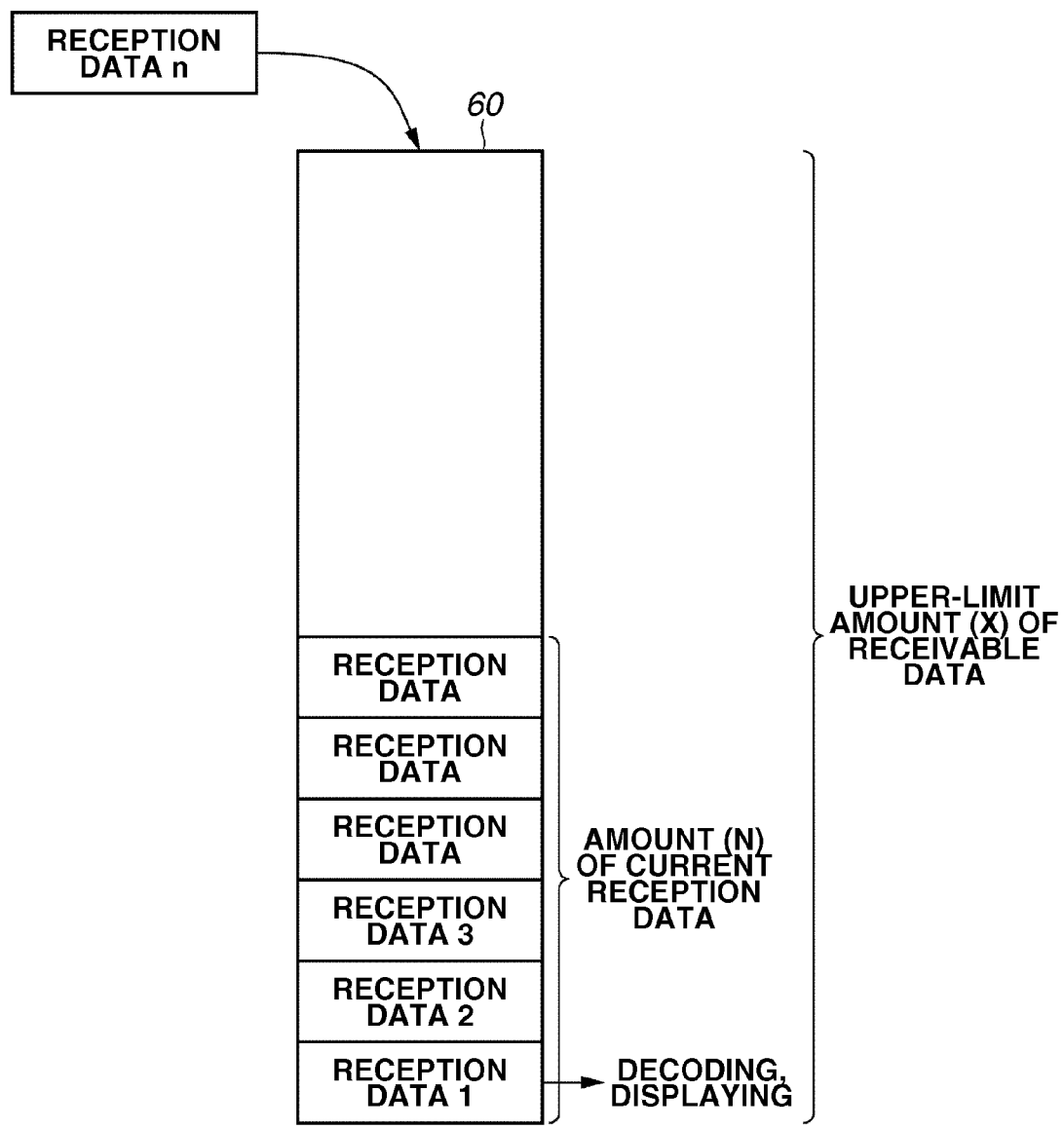
FIG. 5 is a diagram illustrating a buffer included in the reception apparatus.

FIG. 5 is a diagram illustrating a buffer 60 interposed to allow video data received by the video data reception unit 11 of the reception apparatus 10 to be exchanged between the video data decoding unit 18 and the video data playback unit 19. In general, the temporary storage unit 22 of the reception apparatus 10 includes a buffer that temporarily stores data received while the data is delivered to a functional unit to perform a decoding process or a playback process. In an ideal environment where a process time needed to execute the decoding process and the playback process is zero and a delay or fluctuation is not generated at the time of transmitting the video data, the buffer is unnecessary. However, the ideal environment cannot exist in actuality. In particular, since a transmission bandwidth is unstable in a public network such as the Internet, the transmission fluctuation especially affects the playback operation. Accordingly, to remove an influence due to the transmission fluctuation and to realize a normal playback operation, the buffer that temporarily stores the received data is generally used.

The buffer 60 illustrated in FIG. 5 has a first in first out (FIFO) structure. The data received by the video data reception unit 11 is sequentially stored in the buffer 60, and the data in the buffer 60 is sequentially delivered to the video data decoding unit 18 and the video data playback unit 19 according to storage order. In this case, the current amount of data stored in the buffer 60 is assumed as N, and the upper-limit amount of receivable data (the upper-limit amount of data that can be stored in the buffer 60, and a maximum capacity of the buffer 60 in the exemplary embodiment) is assumed as X. When a playback operation is performed at a normal speed (playback speed n=1), even though a state of N<X is maintained, if a flow rate of the data becomes n times by the fast-forward playback at the playback speed n (n>1), a relation of N<X is not maintained, and a so-called "buffer overflow" phenomenon may occur.

Accordingly, in step 404 illustrated in FIG. 4, the reception data monitoring unit 12 monitors the values of the current amount N of the data and the upper-limit amount X of the data of the buffer 60. In the case of N≧X, the reception data monitoring unit 12 determines that a decoding process or a playback process cannot be executed with respect to the transmission amount of data. In addition, the CPU 20 receives the determination result in the reception data monitoring unit 12 and issues a request for only intra-picture coded video data in the following process. Further, the reception data monitoring unit 12 may discard all of the data stored in the buffer 60 at the corresponding time.

Further, the upper-limit amount X of the receivable data is not necessarily equal to the maximum capacity of the buffer 60, and a value that is smaller than the maximum capacity of the buffer 60 may be used as the upper-limit amount X of the data. If the upper-limit amount X of the receivable data is smaller than the maximum capacity of the buffer 60, the possibility of occurrence of the buffer overflow can be reduced. Accordingly, it is possible to execute the decoding process or the playback process without discarding the received video data. Thereby, the playback is stopped until the video data is transmitted after a request for only intra-picture coded video data is issued to the transmission apparatus 30 as the distribution server. As a result, a time for which the video data needs to be in a waiting state can be shortened and a sense of discomfort during the playback can be alleviated.

Further, the upper-limit amount X of the receivable data can be represented as a maximum bit rate per unit time where the data can be processed by the video data decoding unit 18 or the video data playback unit 19 of the reception apparatus 10, that is, where the data can be received by the reception apparatus 10. In this case, when the bit rate N per unit time of the receivable data exceeds the maximum bit rate X, the reception data monitoring unit 12 can determine that the decoding process or playback process in the reception apparatus 10 cannot be performed.

As described above, if the buffer monitoring mechanism is incorporated in the reception data monitoring unit 12 of the reception apparatus 10, it is possible to determine whether the amount of data exceeds the processing capacity of the reception apparatus 10, which is the client terminal (viewing terminal).

However, when traffic that exceeds a transmission capacity of the network through which the video data is exchanged between the reception apparatus 10 and the transmission apparatus 30 is occurring, packets that flow through the network may disappear due to congestion or a collision. In particular, in the case of a transmission method where a retransmission of a disappeared packet such as a user datagram protocol (UDP) datagram packet is not performed, since the disappeared packet is not retransmitted, the disappeared packet cannot be transmitted to the reception apparatus 10. For this reason, since the amount of the data accumulated in the buffer of the reception apparatus 10 actually exceeds the transmission capacity of the network even though the amount of the data is normally recognized, the packets may be disappeared.

In the RTP, a scheme used to detect the disappearance of the packets is prepared. FIG. 6 is a schematic diagram illustrating a packet and a header of the RTP. The RTP defines that a continuous number added one by one per transmission is set in a sequence number field 61 illustrated in FIG. 6.

Figure 7:
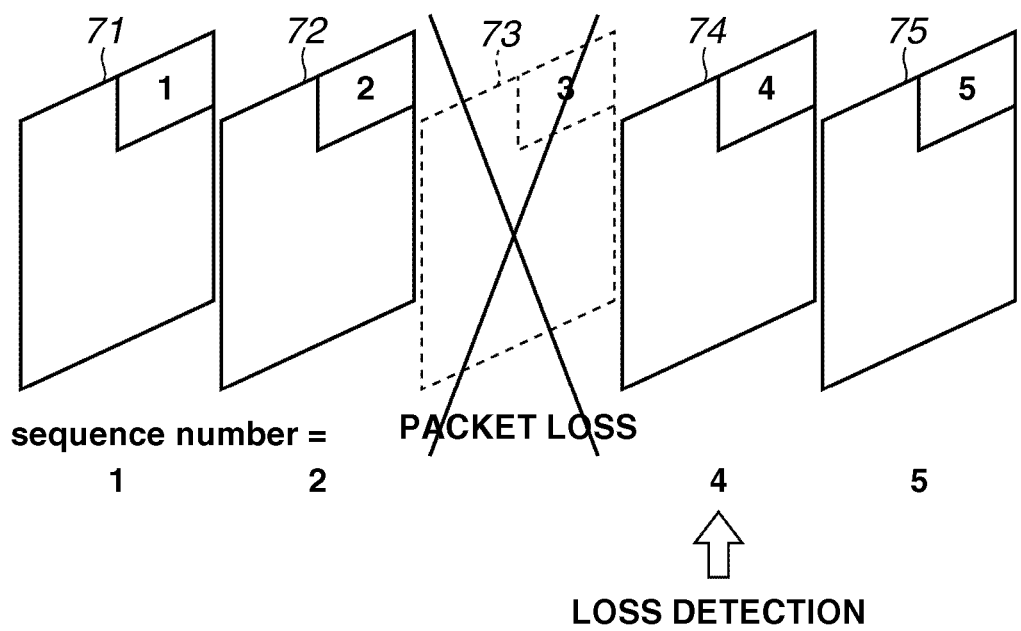
FIG. 7 is a diagram illustrating an example of a packet loss detecting method in the RTP.

An example of a packet loss detection using the sequence number field 61 will be described with reference to FIG. 7. In an example illustrated in FIG. 7, packets 71, 72, 73, 74, and 75 are sequentially transmitted from the transmission apparatus 30, and values "1", "2", "3", "4", and "5" are assigned to the sequence number fields 61 of the packets 71 to 75, respectively. Further, the packet 7 is disappeared during the transmission from the transmission apparatus 30 to the reception apparatus 10.

The reception apparatus 10 confirms whether the values of the sequence number fields 61 of the arrived packets are accurately added one by one. In the example illustrated in FIG. 7, if the packet 74 is received, the reception apparatus 10 detects that the packet 73 where the value "3" of the sequence number field 61 is added is not arrived, that is, the value assigned to the sequence number field 61 is discontinuous. Since the value assigned to the sequence number field 61 of the received packet is discontinuous, the reception apparatus 10 can detect that the amount of data exceeds the transmission capacity of the network. This method is not limited to the RTP, and may be applied to a transmission method that provides a similar scheme.

A determination process with respect to the transmission capacity of the network may be used instead of a reception buffer management in step 404 illustrated in FIG. 4 (above-described monitoring mechanism of the reception buffer) or together with the reception buffer management.

FIG. 8 is a diagram illustrating an example of a communication sequence (protocol sequence) of the RTSP that is executed between the transmission apparatus 30 and the reception apparatus 10, in the case where a process of the flowchart illustrated in FIG. 4 is executed. That is, FIG. 8 illustrates a communication sequence in the case where a specific input operation is performed on the fast-forward button 54 of the user interface 50 while video content is viewed at a normal speed and the fast-forward playback (high-speed playback in the forward direction) is performed.

In FIG. 8, "C→S" indicates an RTSP message transmitted from the control request transmission unit 13 of the reception apparatus 10 as the client terminal to the control request reception unit 33 of the transmission apparatus 30 as the server and includes a playback control request. Further, "S→C" indicates an RTSP message that is transmitted from the video information transmission unit 36 of the transmission apparatus 30 as the server and received by the video information reception unit 15 of the reception apparatus 10 as the client terminal, and includes video information and a response to the playback control request.

The communication sequence used between the transmission apparatus 30 and the reception apparatus 10 according to the exemplary embodiment illustrated in FIG. 8 is almost similar to the communication sequence according to the related art illustrated in FIG. 1, except for a portion of a PLAY (playback) command retransmitted to perform a fast-forward playback. In the communication sequence illustrated in FIG. 8, an x-Intra-Only field 81 is added to the PLAY command to perform the fast-forward playback.

The x-Intra-Only field 81 indicates whether the reception apparatus 10 includes a request for only intra-picture coded video data. In the case where a value is true, only the intra-picture coded video data is requested. Further, the x-Intra-Only field 81 illustrated in FIG. 8 is only exemplary, and if contents indicating that only the intra-picture coded video data is requested are included in the playback control request and the communication protocol specification is satisfied, a form of the field is not limited.

As described above, according to the first exemplary embodiment, when it is determined that the amount of data received when the fast-forward playback is performed at an instructed playback speed exceeds the processing capacity of the system, the reception apparatus 10 transmits to the transmission apparatus 30 the playback control request to request only intra-picture coded video data. As a result, it is possible to provide a special playback function including the fast-forward playback and the rewind playback, where disturbance does not occur in the video. Further, even when the high-speed playback, such as the fast-forward playback or the rewind playback, is requested, the reception apparatus 10 can request only necessary video data without receiving the data that cannot be processed. Accordingly, it is possible to suppress traffic of a transmission path from increasing due to transmission and reception of unnecessary video data, and a process load on the reception apparatus 10 can be alleviated. Further, a large-capacity storage device that realizes a high-speed playback does not need to be newly provided in the reception apparatus 10, and manufacturing costs of the reception apparatus 10 can be suppressed from increasing.

Further, during the operation according to the first exemplary embodiment, since the functions that the video information storage unit 16 and the video information selection unit 17 have are not essential functions, the reception apparatus 10 according to the first exemplary embodiment may not include the video information storage unit 16 and the video information selection unit 17. Further, in the same way, since the function that the transmission history storage unit 38 has is not an essential function, the transmission apparatus 30 according to the first exemplary embodiment may not include the transmission history storage unit 38.

Next, a second exemplary embodiment of the present invention will be described.

Figure 9:
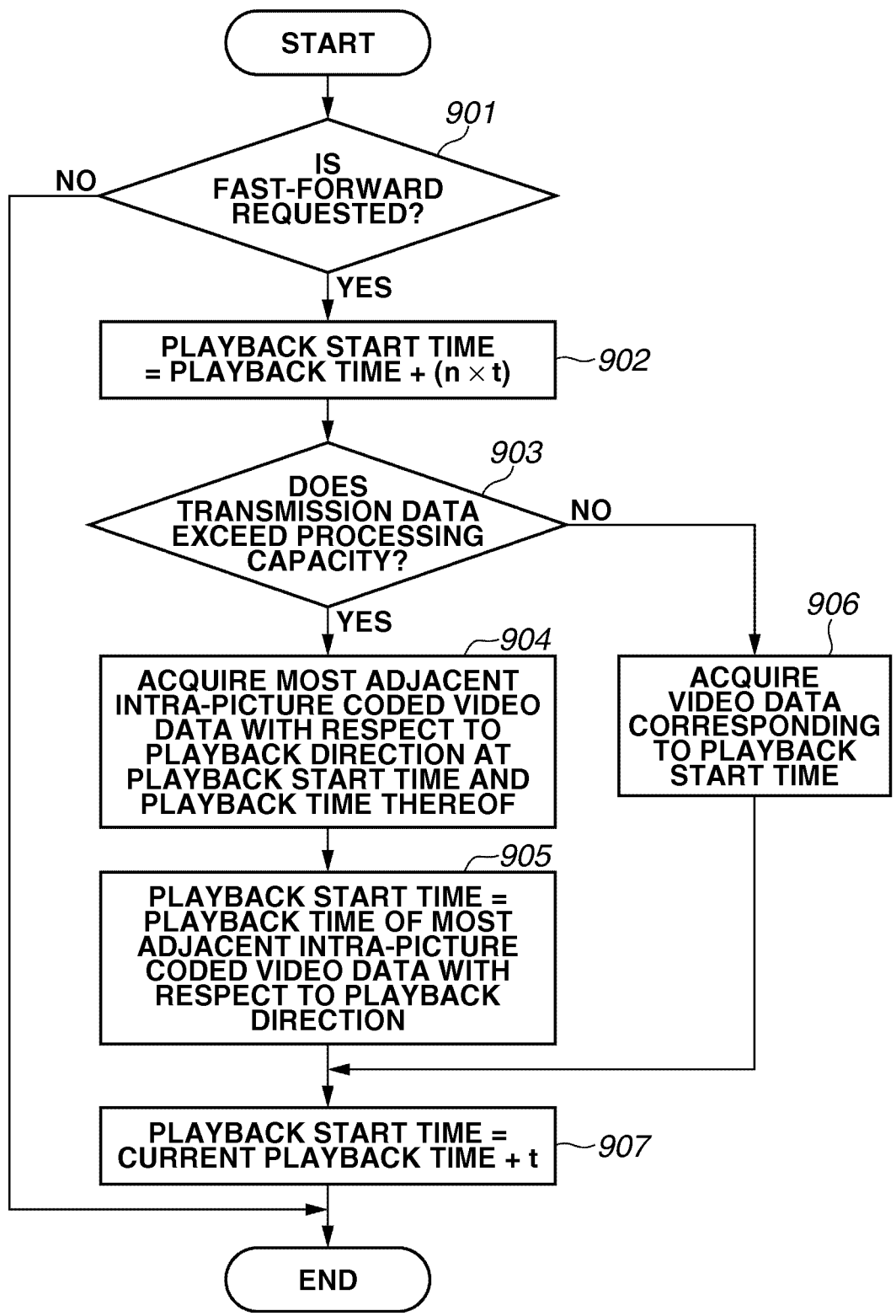
FIG. 9 is a flowchart illustrating an example of an operation of a transmission apparatus according to a second exemplary embodiment of the present invention.

Hereinafter, a process of the transmission apparatus 30 in the case where an operator of the reception apparatus 10 instructs a fast-forward playback (high-speed playback in the forward direction) through the user interface 50 and a playback control request related to the fast-forward playback is transmitted from the reception apparatus 10 will be described with reference to FIG. 9. FIG. 9 is a flowchart illustrating an example of a process operation of the transmission apparatus 30 according to the second exemplary embodiment. The process illustrated in FIG. 9 is executed when a specific operation with respect to the user interface 50 is performed, specifically, when an input operation with respect to the fast-forward button 54 of the user interface 50 is performed.

In step 901 illustrated in FIG. 9, the control request determination unit 35 of the transmission apparatus 30 determines whether a request instructing the fast-forward playback is included in the playback control request received by the control request reception unit 33 and transmitted from the reception apparatus 10. In the exemplary embodiment, when a value that is larger than 1 is set to a Scale (or Speed) Field of the PLAY command, it is assumed that the fast-forward playback is requested. In step 901, when the control request determination unit 35 of the transmission apparatus 30 determines that the fast-forward playback request from the reception apparatus 10 is not included in the received playback control request (NO in step 901), the control request determination unit 35 of the transmission apparatus 30 completes the process illustrated in FIG. 9.

When, in step 901, the control request determination unit 35 of the transmission apparatus 30 determines that the fast-forward playback request from the reception apparatus 10 is included in the received playback control request (YES in step 901), the procedure proceeds to step 902. In step 902, the CPU 41 acquires playback time information of the currently processed video data that is read out by the video data reading unit 37, and sets a time value, which is obtained by adding (a playback speed n×a time interval t between images) to the corresponding playback time, as a playback start time. In the exemplary embodiment, as the playback speed n, the value set to the Scale (or Speed) field of the PLAY command transmitted from the reception apparatus 10 is used.

Next, in step 903, the transmission apparatus 30 determines whether the amount of data transmitted when the data is played back at the playback speed n exceeds a capacity range of the reception apparatus 10 or the network. Specifically, the transmission apparatus 30 determines whether the amount of data transmitted to the reception apparatus 10 exceeds the amount of data that can be processed by the reception apparatus 10 or the amount of data that can be transmitted via the network. Further, which functional unit of the transmitter apparatus 30 is a unit that determines an excess of the processing capacity and the transmission capacity is not described in detail herein, because some specific examples are described after the flowchart illustrated in FIG. 9 is described.

In step 903, in the case where it is determined that the amount of data transmitted when the data is fast-forward played back at the playback speed n exceeds the capacity range of the reception apparatus 10 or the network (YES in step 903), the procedure proceeds to step 904. In step 904, the CPU 41 obtains intra-picture coded video data of a time position most proximate along a playback direction with respect to the playback start time obtained in step 902 and a playback time thereof through the video data reading unit 37. In the exemplary embodiment, since the forward playback is performed, the obtained video data is video data after the playback start time.

Whether the video data is intra-picture coded data is different depending on an encoding format of the video. In the case of the format where the video data is independently encoded for each frame, such as Motion-Joint Photographic Experts Group (JPEG) or Motion-JPEG 2000, it is assumed that all of the video data is the intra-picture coded data and the obtained video data can be used as the transmission data.

Meanwhile, in the case of an encoding format, such as MPEG, H.264, and VC-1, which uses an inter-frame prediction using differential information with preceding and following frames, the obtained video data is not essentially intra-frame coded video data. For this reason, as the operation of the transmission apparatus 30 in the case where non-intra-frame coded video data (inter-picture predictive coded video data) is included in the video data of the process object, the following two processes are considered.

A first method is a method in which the image data reading unit 37 searches the intra-picture coded video data of a time position most proximate along a playback direction with respect to the playback start time obtained in step 902 and acquires the intra-picture coded video data. A second method is a method in which the video data encoding unit 39 encodes the video data again as the intra-picture coded video data, based on frame information where the video data of the process object is referred to.

According to the first method, since a new encoding process does not need to be executed, a process load is small. However, when the playback speed and the interval of the intra-picture coded video data are very different from each other, a sense of discomfort may occur in the played-back video, because of a difference between the required playback speed and the actual playback speed. Meanwhile, according to the second method, the playback operation is natural. However, since an encoding process is needed, a process load is increased. The first method or the second method may be arbitrary selected according to the system. Further, only one of the first method and the second method may be used and the first method and the second method may be adaptively switched according to a situation, such as a CPU load of the transmitting apparatus 30 or the number of connections.

Next, in step 905, the CPU 41 sets the playback time of the intra-frame coded video data obtained in step 904 as the playback start time.

Meanwhile, in step 903, when it is determined that the amount of transmitted data does not exceed the capacity of the reception apparatus 10 or the network (NO in step 903), the procedure proceeds to step 906. In step 906, the CPU 41 extracts the video data corresponding to the playback start time obtained in step 902 using the video data reading unit 37, but does not change the playback start time.

In this way, the video data displayed at the time of the fast-forward playback and the playback start time are extracted. In this case, it should be noted that the extracted playback start time is a playback start time along a time axis of the video data. When the reception apparatus 10 performs a playback along the time axis of the video data, the future time obtained by fast-forward is the time when the reception apparatus 10 performs a normal playback. If the video data is transmitted without a change, the high-speed playback is not performed. The simply received video is played back after a waiting state until the designated time. Accordingly, in step 907, the CPU 41 sets a value of (current playback time+t) as a new playback start time at the time of transmission. That is, the fast-forward operation is handled as a normal playback operation. By the process, the subsequently played-back video data can be set as the subsequently played-back video data at the time of an nx-speed playback.

If the playback start time and the video data transmitted in the above method are set, the CPU 41 of the transmission apparatus 30 packetizes the video data and the playback start time and sequentially transmits the video data from the video data transmission unit 32. The data transmitted from the video data transmission unit 32 is received by the reception apparatus 10 and subjected to a decoding process. Then, the data is played back and displayed in the display area 51 illustrated in FIG. 3.

Then, the processing returns to step 901, and the processes illustrated in FIG. 9 are continuously executed while the fast-forward playback is requested from the reception apparatus 10 according to the playback control request.

In the description until now, it is assumed that the reception apparatus 10 does not change the playback speed described in the first exemplary embodiment in regards to the fast-forward operation, for convenience of explanation. However, the combination of the first exemplary embodiment and the second exemplary embodiment may be implemented, and the process of step 907 may be unnecessary, which is very complicated in the description thereof. Accordingly, the description of the detailed operation is omitted. An example of a joint operation between the transmission apparatus 30 and the reception apparatus 10 is described in a third exemplary embodiment.

Next, in step 903 of the flowchart illustrated in FIG. 9, a specific example of a method where the functional unit of the transmission apparatus 30 determines whether the amount of transmitted data exceeds the processing capacity of the reception apparatus 10 or the transmission capacity of the network will be described.

First, the first determination method is a method in which it is determined whether only intra-picture coded video data is requested expressly from the reception apparatus 10. As an example of the explicit request for only intra-picture coded video data, there is the x-Intra-Only command, such as the x-Intra-Only field 81 of the RTSP sequence illustrated in FIG. 8 in the first exemplary embodiment. The control request determination unit 35 of the transmission apparatus 30 checks whether contents indicating that only intra-picture coded video data is requested are included in the playback control request received by the control request reception unit 33. If the contents are included in the playback control request, the control request determination unit 35 determines whether the amount of data exceeds the processing capacity of the reception apparatus 10.

Further, the second determination method is a method that determines whether the amount of data exceeds the transmission capacity of the network, from the transmission state of the network notified implicitly from the reception apparatus 10. When the RTP is used as the transmission protocol of the video data, the RTCP (RTP Control Protocol defined by the RFC 3550, similar to the RTP) that is included in the RTP and used to report the network state is also used.

FIG. 10 is a diagram illustrating the configuration of a Receiver Report (RR) packet, which is periodically transmitted to a transmission apparatus, such that a reception apparatus feeds back a reception status in the RTCP. In a cumulative number of packets lost field 100 of the RR packet, the number of lost packets detected until a point of time when the current RR packet is transmitted from a point of time when a previous RR packet is transmitted is set. If the RR packet that includes information indicating the number of lost packets on the network is transmitted to the transmission apparatus 30, a transmission state of the network can be notified implicitly from the reception apparatus 10 to the transmission apparatus 30. The control request determination unit 35 of the transmission apparatus 30 checks the received RR packet from the reception apparatus 10. When the number of lost packets exceeds a threshold value, the control request determination unit 35 can determine that the amount of data exceeds the transmission capacity of the network.

Further, the third determination method is a method in which the transmission data monitoring unit 34 of the transmission apparatus 30 monitors a bit rate of the video data transmitted from the video data transmission unit 32 and determines that the amount of data exceeds the processing capacity of the reception apparatus 10, when the bit rate exceeds the bit rate of the video data that can be received by the reception apparatus 10. For example, the bit rate where the video data can be received by the reception apparatus 10 can be previously notified to the transmission apparatus 30 by a Bandwidth field 82 of the RTSP sequence illustrated in FIG. 8 in the first exemplary embodiment. In this case, the transmission data monitoring unit 34 can assume that the amount of data exceeds the reception capacity of the reception apparatus 10 at a point of time when a transmission bit rate per second exceeds a value illustrated by the Bandwidth field 82.

According to the second exemplary embodiment, in the case where the transmission apparatus 30 receives a high-speed playback request at a playback speed n, when it is determined that the amount of transmission data exceeds the capacity of the reception apparatus 10 or the network, the transmission apparatus 30 transmits only intra-picture coded video data. As a result, it is possible to execute a process of a special playback including a fast-forward playback or a rewind playback without increasing a load on the reception apparatus 10 or the network.

Further, when it is determined that the amount of transmission data exceeds the capacity range of the reception apparatus 10 or the network based on the transmission situation or the reception situation, an extension that allows a special command requesting only intra-picture coded video data to the reception apparatus is not needed. Accordingly, a similar function can be provided even to a general reception apparatus 10.

During the operation according to the second exemplary embodiment, since the functions that the video information storage unit 16 and the video information selection unit 17 have are not essential functions, the reception apparatus 10 according to the second exemplary embodiment may not include the video information storage unit 16 and the video information selection unit 17. Further, in the same way, since the function that the transmission history storage unit 38 has is not an essential function, the transmission apparatus 30 according to the second exemplary embodiment may not include the transmission history storage unit 38.

As described above, according to the first and second exemplary embodiments, it is possible to construct a communication system that provides a function of a special playback including a fast-forward playback and a rewind playback according to an allowed load without increasing a cost. In the following description, in the communication system according to the exemplary embodiments of the present invention, solutions of items that can be improved and developed are described as individual exemplary embodiments.

Next, the third exemplary embodiment of the present invention will be described.

In the first and second exemplary embodiments, the playback speed that the reception apparatus 10 requests is not necessarily equal to the playback speed of the video data transmitted from the transmission apparatus 30. In particular, in the case where the intra-picture predictive coded video data is included and next intra-picture coded video data is searched along a playback direction from the designated playback start time, if the interval of the intra-picture coded video data is large, an influence due to mismatch between the playback speeds remarkably appears.

Accordingly, in the third exemplary embodiment, the playback speed supported by the transmission apparatus 30 is previously notified to the reception apparatus 10, and the reception apparatus 10 requests only the supported playback speed.

In the third exemplary embodiment, the CPU 41 of the transmission apparatus 30 detects an interval (a frame interval or a picture interval) of insertion of the intra-picture coded video data, and calculates a playback speed that can be designated based on the information obtained by the video data reading unit 37. For example, when intra-picture coded video data exists for every five frames, the video data can be played back at a playback speed of 5× and 10×. Video information that includes information indicating the designated playback speed obtained by the above method is transmitted from the video information transmission unit 36 of the transmission apparatus 30 to the reception apparatus 10. As a result, the playback speed supported by the transmission apparatus 30 is notified to the reception apparatus 10.

FIG. 11 is a diagram illustrating an example of a communication sequence of the RTSP performed between the transmission apparatus 30 and the reception apparatus 10 according to the third exemplary embodiment. The communication sequence according to the third exemplary embodiment illustrated in FIG. 11 is almost similar to the communication sequence according to the first exemplary embodiment illustrated in FIG. 8. The communication sequence according to the third exemplary embodiment is different from the communication sequence according to the first exemplary embodiment in a portion of a response (setting information) by the transmission apparatus 30 to the SETUP (distribution setting) command from the reception apparatus 10.

In the example illustrated in FIG. 11, an x-AvailSpeed field 111 is added to the response by the transmission apparatus 30 to the received SETUP command. The communication device 30 sets the supported playback speed to the x-AvailSpeed field 111 and transmits the set speed to notify the reception apparatus 10 of the supported playback speed. In the example illustrated in FIG. 11, the supported playback speed is divided by ";" and a plurality of playback speeds can be set. As a result, information indicating that a plurality of playback speeds are supported is also notified. The method illustrated in FIG. 11 is only exemplary, and the present invention is not limited thereto. If contents having a similar meaning can be notified, a grammar thereof is not limited.

In the above description, the transmission apparatus 30 calculates the designated playback speed from the interval of the intra-picture coded video data and notifies the playback speed. However, if the reception apparatus 10 can calculate the playback speed, information that is notified from the transmission apparatus 30 to the reception apparatus 10, for example, the interval of the intra-picture coded video data and the number of intra-picture coded video data per unit time, may not be necessarily the designated playback speed. In the example, the designated playback speed is notified with the response by the transmission apparatus 30 to the SETUP command, but the present invention is not limited. The playback speed may be notified at arbitrary timing before the reception apparatus 10 starts to play back the video data.

If the video information reception unit 15 of the reception apparatus 10 receives the video information that is transmitted by the above method and includes the information indicating the playback speed supported by the transmitted device 30, the CPU 20 stores the received information in the video information storage unit 16. In addition, if the fast-forward button 54 (or the rewind button 53) of the user interface 50 of the reception apparatus 10 illustrated in FIG. 3 is pressed, the CPU 20 of the reception apparatus 10 instructs the video information selection unit 17 to select a playback speed corresponding to the input operation. The video information selection unit 17 that has received the instruction extracts the playback speed corresponding to the operation, which is input form the user interface 50, from the video information stored in the video information storage unit 16. In addition, the CPU 20 sets the playback speed, which is extracted and selected by the video information selection unit 17, as the video playback speed n. The process operation after the playback speed n is set is similar to the process operation illustrated in FIG. 4 in the first exemplary embodiment.

Further, the user interface 50 of the reception apparatus 10 may switch a plurality of playback speeds according to an input operation from an operator. For example, in the example of the user interface 50 illustrated in FIG. 3, if the fast-forward button 54 is pressed once, the playback speed is set as 5×, and if the fast-forward button 54 is pressed two times, the playback speed is set as 10×. That is, a plurality of playback speeds may be switched according to the operation on the fast-forward button 54. Based on the length of the time for which the button is pressed (or strength by which the button is pressed), and a rotational number or angle and an inclination in the case of an interface other than the button, the video information selection unit 17 may select an arbitrary playback speed from the playback speeds supported by the transmission apparatus 30 and the data playback at the selected playback speed may be required. Further, the selected playback speed can be displayed in the display area 51 of the user interface 50, such that the operator can easily recognize the playback speed.

According to the third exemplary embodiment, it is possible to prevent the playback speed required by the reception apparatus 10 constituting the communication system and the playback speed supported by the transmission apparatus 30 from being mismatched to each other. Accordingly, it is possible to remove a sense of discomfort due to a difference between the speed required at the time of the operation and the actual playback speed.

Next, a fourth exemplary embodiment of the present invention will be described.

The fourth exemplary embodiment can be used in the case where the playback speed required by the reception apparatus 10 and the playback speed of the video data transmitted from the transmission apparatus 30 are mismatched to each other. For example, the fourth exemplary embodiment can be used in the case where the third exemplary embodiment cannot be applied.

Figure 12:
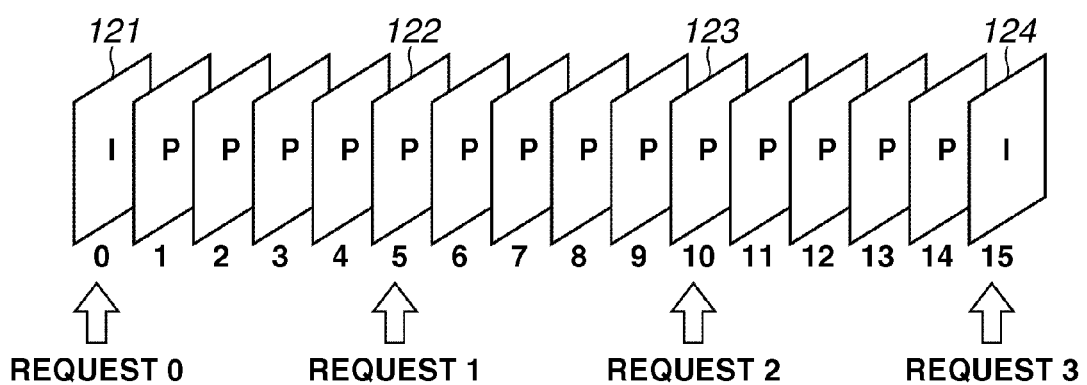
FIG. 12 is a diagram illustrating the case where a playback speed required by a reception apparatus and a playback speed supported by a transmission apparatus are mismatched.

As illustrated in FIG. 12, intra-picture coded video data (I pictures) 121 and 124 for every 15 frames are generated and a frame that exists between the video data is inter-picture predictive coded video data (P picture). As such, when the inter-picture predictive coded video data is included, and the transmission apparatus does not perform encoding again at the time of a high-speed playback request and searches the intra-picture coded video data most proximate along a playback direction, the playback speed supported by the transmission apparatus becomes 15×.

In this case, when the reception apparatus cannot receive the playback speed supported by the transmission apparatus, the transmission apparatus is required to follow an arbitrary playback speed instructed from the reception apparatus. In the example illustrated in FIG. 12, if the playback speed required from the reception apparatus is 5×, the video data to be played back become 121, 122, 123, and 124. However, the video data 122 and 123 are not the intra-picture coded video data but inter-picture predictive coded video data. Accordingly, when the playback speed required from the reception apparatus is 5×, the video data 121, 124, 124, and 124 are transmitted from the transmission apparatus to the reception apparatus.

As such, when the playback speed required by the reception apparatus is mismatched to the interval of the intra-picture coded video data of the video data (playback speed supported by the transmission apparatus), the same video data is transmitted many times from the transmission apparatus to the reception apparatus. Since the overlapped video data displays the same video at the same playback time, abnormality is not discovered in the playback operation. However, the repetitive transmission of the same data is useless and a load is generated in the network or the storage device of the reception apparatus.

A process example of the transmission apparatus 30 according to the fourth exemplary embodiment to resolve the above problem will be described with reference to FIG. 13. FIG. 13 is a flowchart illustrating an example of a process operation of the transmission apparatus 30 according to the fourth exemplary embodiment. In this case, a process for avoiding the repetitive transmission of the video data is added to the process by the transmission apparatus 30 according to the second exemplary embodiment illustrated in FIG. 9.

In FIG. 13, since processes of steps 1301 to 1306 and 1309 are similar to the processes of steps 901 to 906 and 907 illustrated in FIG. 9, the description thereof is omitted.

In step 1307, the CPU 41 of the transmission apparatus 30 determines whether the playback start time obtained in the previous processes exists in the transmission history storage unit 38, which stores the transmission history of the transmitted video data.

When the playback start time of the video data to be transmitted exists in the transmission history of the transmission history storage unit 38 (YES in step 1307), the video data has previously been transmitted. Therefore, the CPU 41 returns to the process of step 1302 to obtain the following intra-picture coded video data. Meanwhile, when the playback start time of the video data to be transmitted does not exist in the transmission history of the transmission history storage unit 38 (NO in step 1307), then in step S1308, the CPU 41 registers the corresponding time in the transmission history storage unit 38. Then, the CPU 41 executes the process of step 1309 and completes the processes illustrated in FIG. 13.

The video data of the playback start time selected during the process is transmitted from the video data transmission unit 32 to the reception apparatus 10 during the subsequent in step 402 process.

According to the fourth exemplary embodiment, if the history of the transmitted video data is managed by the transmission history storage unit 38, it is possible to prevent the transmitted video data from being retransmitted. As a result, it is possible to realize a process of a special playback including a fast-forward playback and a rewind playback, without increasing a load on the network or the reception apparatus 10 due to the transmission of the unnecessary video data.

Next, a fifth exemplary embodiment of the present invention will be described.

In the above-described individual exemplary embodiments, it is possible to estimate the arbitrary playback speed with respect to the transmission apparatus 30, by the method, such as the Scale (or Speed) field of the RTSP. However, even though the transmission apparatus 30 designates the playback speed from the reception apparatus 10 when the transmission apparatus 30 does not receive the designation of the playback speed, the transmission of the video speed at the corresponding playback speed is not made.

Accordingly, in the fifth exemplary embodiment, a method that enables a special playback even when the transmission apparatus 30 does not receive the designation of the playback speed will be described.

First, a basic process operation of the reception apparatus 10 according to the fifth exemplary embodiment is similar to the example of the process operation of the reception apparatus 10 according to the first exemplary embodiment illustrated in FIG. 4. However, in the present exemplary embodiment, when the playback control request is issued to the transmission apparatus 30, the same time value as the playback start time is set to the playback completion time, and the playback control request is transmitted. That is, the playback control request is issued in a state where the video data of the playback start time is not a moving image but a still image.

In addition, while the operation with respect to the user interface 50 is continued, the playback start time is changed and the playback control request where the same time is set to the playback start time and the playback completion time is continuously issued. By executing the above process, the still images according to the playback start time are continuously reproduced. As a result, the same playback effect as that of the special playback can be obtained.

FIG. 14 is a diagram illustrating an example of a communication sequence of the RTSP performed between the transmission apparatus 30 and the reception apparatus 10 according to the fifth exemplary embodiment. Further, since the flow until the playback start is similar to that of the communication sequence according to the first exemplary embodiment illustrated in FIG. 8, the flow is omitted in the communication sequence illustrated in FIG. 14.

FIG. 14 illustrates an aspect where a playback completion time of the same time as the playback start time is set to the Range fields 141, 142, 143, and 144 of the RTSP message, and a PLAY command is continuously issued for every 0.5 second. Further, the Scale field does exist in the PLAY command.

As described above, the playback control request where the playback completion time of the same time as the playback start time is set can be transmitted to the transmission apparatus 30 as a request for intra-picture coded video data. According to the present exemplary embodiment, even when a distribution function of video data at an arbitrary playback speed is not mounted in the transmission apparatus 30 or it is difficult to mount the distribution function because of any reason, it is possible to realize a special playback process by only the control at the side of the reception apparatus 10.

In the individual exemplary embodiments, the video data requested and transmitted at the time of the special playback is the intra-picture coded video data proximate in the playback direction, but the present invention is not limited thereto. The process object may be intra-frame coded video data of "a head of a scene" that is proximate in the playback direction.

Figure 15:
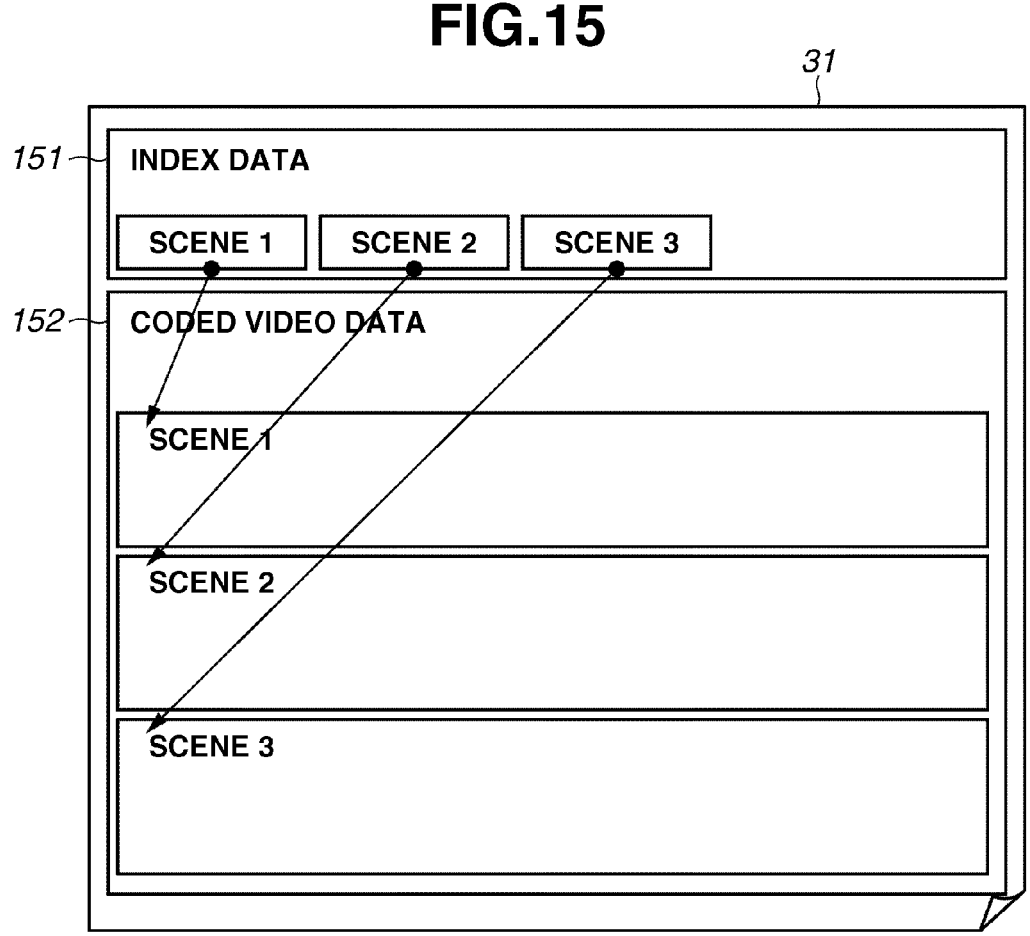
FIG. 15 is a diagram illustrating an example of video data that includes index data and encoded video data.

FIG. 15 is a diagram illustrating the general data configuration in the case where image data 31 holds scene information. When the video data is composed of a plurality of scenes, the video data 31 typically has index data 151 and coded video data 152. The coded video data 152 is composed of a group of coded video data that is physically or logically divided for every scene. The index data 151 is data that holds positional information of a head of each scene.

The index data 151 and the coded video data 152 are integrated with the same data field and held, or are held in a physically or logically separated form. Further, a form where the index data and the video decoded data are recorded in an interleaved format is considered. As a typical example of the scene information, a "chapter" in a DVD is considered. In the case of a DVD, a Blue-ray Disc, or a high definition (HD) DVD, the video data is recorded as inter-picture predictive coded data of the format of MPEG/H.264, and a head of a scene is generally intra-picture coded video data. Therefore, this can be as an application example of the exemplary embodiment.

If the transmission apparatus 30 receives the playback control request indicating the special playback from the reception apparatus 10, the transmission apparatus 30 may search scenes proximate in a playback direction based on an element such as the number of times of receiving the playback control request or a required playback speed, and sequentially transmit the scenes.

In the individual exemplary embodiments, the case where the fast-forward playback as an example of the special playback is performed has been exemplified. However, even in the case where the rewind playback is performed, the same process may be executed, except that the playback direction is reversed. Further, the individual exemplary embodiments are not necessarily independently realized, and may be arbitrarily combined.

To operate various devices to realize the functions of the exemplary embodiments, software programs for realizing the functions of the exemplary embodiments are provided to a computer (CPU or micro processing unit (MPU)) in a system or a device connected to the various devices. In addition, exemplary embodiments realized by operating the various devices according to the programs stored in the computer of the system or the device are also included in the scope of the present invention.

In this case, the software programs realize the functions of the exemplary embodiments, and constitute the present invention. Further, a unit used to provide the programs to the computer, for example, a storage medium where the programs, are stored constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-178451 filed Jul. 8, 2008, which is hereby incorporated by reference herein in its entirety.

What is claimed is:

1. A reception apparatus for receiving video data transmitted from a transmission apparatus via a transmission path, the reception apparatus comprising:
   a monitoring unit configured to monitor a status of the reception apparatus or a status of the transmission path;
   a transmission unit configured to transmit to the transmission apparatus a playback control request including a playback speed for the video data and a request for intra-picture coded video data, according to the status of the reception apparatus or the status of the transmission path monitored by the monitoring unit; and
   a video data reception unit configured to receive from the transmission apparatus the intra-picture coded video data determined based in an interval of intra-picture coded video data corresponding to the requested playback speed and an interval at which the transmission apparatus generates intra-picture coded video data.

2. The reception apparatus according to claim 1,
   wherein the monitoring unit monitors a current amount of video data received by the video data reception unit and stored in the reception apparatus and an upper-limit amount of video data storable in the reception apparatus, and
   wherein, if, based on the current amount of video data, the upper-limit amount when the video data is played back at the designated playback speed, the monitoring unit determines that an amount of stored video data exceeds the upper-limit amount when the video data is played back at the designated playback speed, the transmission unit transmits the playback control request including the playback speed and the request for intra-picture coded video data.

3. The reception apparatus according to claim 1,
   wherein the monitoring unit monitors a current bit rate of video data received by the video data reception unit, and
   wherein, if the monitoring unit determines that the current bit rate exceeds a range of bit rates enabling a process, the transmission unit transmits the playback control request including the playback speed and the request for intra-picture coded video data.

4. The reception apparatus according to claim 1,
   wherein the video data is packetized and transmitted in a state where continuous numbers are assigned to individual packets,
   wherein the monitoring unit monitors the numbers assigned to the packets received by the video data reception unit, and
   wherein, when the monitoring unit determines that the numbers assigned to the packets are discontinuous, the transmission unit transmits the playback control request including the playback speed and the request for intra-picture coded video data.

5. The reception apparatus according to claim 1, further comprising a user interface configured to determine that a playback at the playback speed is requested when a specific operation is performed, wherein the transmission unit transmits the playback control request including the playback speed and the request for intra-picture coded video data according to the determination result while the specific operation on the user interface is continued.

6. The reception apparatus according to claim 1, further comprising:

a video information reception unit configured to receive information related to an image interval of intra-picture coded images transmitted from the transmission apparatus; and a video information selection unit configured to select a playback speed of the video data based on the information related to the image interval received by the video information reception unit.

7. The reception apparatus according to claim 1, wherein the video data reception unit receives coded video data without receiving the same intra-picture coded video data a plurality of times when an interval of intra-picture coded video data corresponding to the requested playback speed is not matched to an interval at which the transmission apparatus generates intra-picture coded video data.

8. A transmission apparatus for transmitting video data to a reception apparatus via a transmission path, the transmission apparatus comprising:

a video data transmission unit configured to transmit the video data; and a reception unit configured to receive a playback control request including a playback speed for the video data and information indicating whether a transmission of inter-picture coded data is needed from the reception apparatus, wherein, if the reception unit receives the playback control request including a playback speed for the video data and the information indicating the transmission of the inter-picture coded data is needed, the video data transmission unit transmits intra-picture coded video data and the inter-picture coded video data to the reception apparatus corresponding to the playback speed, and wherein, if the reception unit receives the playback control request including a playback speed for the video data and the information indicating the transmission of the inter-picture coded data is not needed, the video data transmission unit transmits, based on an interval of intra-picture coded video data corresponding to the requested playback speed and an interval at which the transmission apparatus generates intra-picture coded video data, the intra-picture coded video data to the reception apparatus and does not transmit the inter-picture coded video data to the reception apparatus.

9. The transmission apparatus according to claim 7, further comprising a video data transmission unit configured to transmit to the reception apparatus information related to an image interval of intra-picture coded images of the video data transmitted by streaming.

10. The transmission apparatus according to claim 7, further comprising a video data recording unit configured to record video data and supplementary information used at the time of transmitting the video data.

11. The transmission apparatus according to claim 8, wherein if the reception unit receives the playback control request including a playback speed for the video data and the information indicating the transmission of the inter-picture coded data is not needed, the video data transmission unit transmits the intra-picture coded video data without transmitting the same intra-picture coded video data a plurality of times when an interval of intra-picture coded video data corresponding to the requested playback speed is not matched to an interval at which the video data transmission apparatus generates intra-picture coded video data.

12. A reception apparatus for receiving video data transmitted from a transmission apparatus via a transmission path, the reception apparatus comprising:

a monitoring unit configured to monitor a status of the reception apparatus or a status of the transmission path; and a transmission unit configured to transmit to the transmission apparatus a playback control request including a playback speed for the video data and a request for prohibition of transmission of inter-picture predictive coded video data to the transmission apparatus, according to the status of the reception apparatus or the status of the transmission path monitored by the monitoring unit; and a video data reception unit configured to receive from the transmission apparatus the intra-picture coded video data determined based on an interval of intra-picture coded video data corresponding to the requested playback speed and an interval at which the transmission apparatus generates intra-picture coded video data.

13. A communication method for a reception apparatus that receives video data transmitted from a transmission apparatus via a transmission path, the communication method comprising:

monitoring a status of the reception apparatus and a status of the transmission path; and transmitting a playback control request including a playback speed for the video data and a request for intra-picture coded video data, according to the status of the reception apparatus or the status of the transmission path monitored by the monitoring unit receiving video data from the transmission apparatus the intra-picture coded video data determined based on an interval of intra-picture coded video data corresponding to the requested playback speed and an interval at which the transmission apparatus generates intra-picture coded video data.

14. A communication method according to claim 13, further comprising:

monitoring a current amount of stored video data in the reception apparatus and an upper-limit amount of video data storable in the reception apparatus; and if an amount of stored video data exceeds the upper-limit amount when the video data is played back at the designated playback speed, transmitting the playback control request including the designated playback speed and the request for intra-picture coded video data.

15. The communication method according to claim 13, wherein the receiving step receives coded video data without receiving the same intra-coded video data a plurality of times when an interval of intra-picture coded video data corresponding to the requested playback speed is not matched to an interval at which the transmission apparatus generates intra-picture coded video data.

16. A communication method for a transmission apparatus that transmits video data to a reception apparatus via a transmission path, the communication method comprising:
- transmitting the video data;
- receiving a playback control request including a playback speed for the video data and information indicating whether a transmission of inter-picture coded data is needed;
- if the transmission apparatus receives the playback control request including a playback speed for the video data and the information indicating the transmission of the inter-picture coded data is needed, transmitting intra-picture coded video data and the inter-picture coded video data to the reception apparatus corresponding to the playback speed; and
- if the transmission apparatus receives the playback control request including a playback speed for the video data and the information indicating the transmission of the inter-picture coded data is not needed, transmitting, based on an interval of intra-picture coded video data corresponding to the requested playback speed and an interval at which the transmission apparatus generates intra-picture coded video data, the intra-picture coded video data to the reception apparatus without transmitting the inter-picture coded video data to the reception apparatus.

17. A communication method according to claim 16, further comprising:
- transmitting to the reception apparatus information related to an image interval of intra-picture coded images of the video data transmitted.

18. The communication method according to claim 16, wherein if the transmission apparatus receives the playback control request including a playback speed for the video data and the information indicating the transmission of the inter-picture coded data is not needed, the transmitting step transmits the intra-picture coded video data without transmitting the same intra-picture coded video data a plurality of times when an interval of intra-picture coded video data corresponding to the requested playback speed is not matched to an interval at which the transmission apparatus generates intra-picture coded video data.

19. A non-transitory computer-readable storage medium storing a program for causing a computer to execute a process for receiving video data transmitted from a transmission apparatus via a transmission path, the program comprising:
- monitoring a status of the computer or a status of the transmission path; and
- transmitting a playback control request including a playback speed for the video data and a request for intra-picture coded video data according to the status of the computer or the status of the transmission path monitored by the monitoring unit
- receiving from the transmission apparatus the intra-picture coded video data determined based on an interval of intra-picture coded video data corresponding to the requested playback speed and an interval at which the transmission apparatus generates intra-picture coded video data.

20. A non-transitory computer-readable storage medium according to claim 19, the program comprising:
- monitoring a current amount of stored video data in the computer and an upper-limit amount of video data storable in the computer; and
- if an amount of stored video data exceeds the upper-limit amount when the video data is played back at the designated playback speed, transmitting the playback control request including the designated playback speed and the request for intra-picture coded video data.

21. A non-transitory computer-readable storage medium storing a program for causing a computer to execute a process for transmitting video data to a reception apparatus via a transmission path, the program comprising:
- transmitting the video data;
- receiving a playback control request including a playback speed for the video data and information indicating whether a transmission of inter-picture coded data is needed;
- if the transmission apparatus receives the playback control request including a playback speed for the video data and the information indicating the transmission of the inter-picture coded data is needed, transmitting intra-picture coded video data and the inter-picture coded video data to the reception apparatus corresponding to the playback speed; and
- if the transmission apparatus receives a the playback control request including a playback speed for the video data and the information indicating the transmission of the inter-picture coded data is not needed, transmitting, based on an interval of intra-picture coded video data corresponding to the requested playback speed and an interval at which the intra-picture coded video data is generated, the intra-picture coded video data to the reception apparatus without transmitting the inter-picture coded video data to the reception apparatus.

22. A non-transitory computer-readable storage medium according to claim 21, the program comprising:
- transmitting information related to an image interval of intra-picture coded images of the video data transmitted.

* * * * *